US008893307B2

(12) United States Patent
Kuno et al.

(10) Patent No.: US 8,893,307 B2
(45) Date of Patent: Nov. 18, 2014

(54) INFORMATION PROCESSING SYSTEM AND METHOD FOR PROVIDING AUTHORIZED CONTENT

(75) Inventors: Hiroshi Kuno, Kanagawa (JP);
Takamichi Hayashi, Tokyo (JP);
Yoshiyuki Kobayashi, Tokyo (JP);
Katsumi Muramatsu, Tokyo (JP)

(73) Assignee: Sony Corporation, Tokyo (JP)

( * ) Notice: Subject to any disclaimer, the term of this patent is extended or adjusted under 35 U.S.C. 154(b) by 179 days.

(21) Appl. No.: 13/466,421

(22) Filed: May 8, 2012

(65) Prior Publication Data

US 2012/0311318 A1 Dec. 6, 2012

(30) Foreign Application Priority Data

May 31, 2011 (JP) .................. 2011-121344

(51) Int. Cl.
*H04L 9/08* (2006.01)
*G11B 20/00* (2006.01)
*H04N 21/4405* (2011.01)
*H04L 29/06* (2006.01)
*H04N 21/658* (2011.01)
*H04N 21/6334* (2011.01)
*H04N 21/266* (2011.01)
*H04N 21/235* (2011.01)
*H04N 21/8352* (2011.01)
*H04N 21/845* (2011.01)

(52) U.S. Cl.
CPC ...... *H04L 63/0428* (2013.01); *G11B 20/00181* (2013.01); *G11B 20/00528* (2013.01); *H04N 21/4405* (2013.01); *G11B 20/00869* (2013.01); *H04N 21/6581* (2013.01); *H04N 21/6334* (2013.01); *H04N 21/26613* (2013.01); *H04N 21/2351* (2013.01); *H04N 21/8352* (2013.01); *H04N 21/8456* (2013.01); *G11B 20/00507* (2013.01)

USPC ................ 726/32; 726/29; 713/150; 380/278

(58) Field of Classification Search
CPC ................... H04L 63/0478; H04L 63/0428
USPC ........................ 726/32, 29; 713/150; 380/278
See application file for complete search history.

(56) References Cited

U.S. PATENT DOCUMENTS

| | | | |
|---|---|---|---|
| 5,673,316 A * | 9/1997 | Auerbach et al. ............... | 705/51 |
| 7,412,060 B2 * | 8/2008 | Fukuda ......................... | 380/277 |
| 2004/0105544 A1 * | 6/2004 | Haneda et al. .................. | 380/231 |
| 2005/0273862 A1 * | 12/2005 | Benaloh et al. ................. | 726/26 |
| 2006/0059179 A1 | 3/2006 | Asano | |
| 2006/0075228 A1 * | 4/2006 | Black et al. .................... | 713/167 |
| 2007/0256141 A1 * | 11/2007 | Nakano et al. .................. | 726/27 |
| 2007/0282749 A1 * | 12/2007 | Nonaka et al. .................. | 705/51 |
| 2009/0013195 A1 * | 1/2009 | Ochi et al. ..................... | 713/193 |

(Continued)

*Primary Examiner* — Beemnet Dada
*Assistant Examiner* — J. Brant Murphy
(74) *Attorney, Agent, or Firm* — Oblon, Spivak, McClelland, Maier & Neustadt, L.L.P.

(57) ABSTRACT

An information processing system includes: a client executing acquisition and reproduction of contents; a management server providing the client with content selection information applied for acquisition of contents; and a content providing server receiving the content selection information from the client and providing the content selected in accordance with the content selection information, wherein the content selection information includes content identifiers as identifiers of encrypted contents respectively encrypted by different encryption keys and range information indicating data areas of range data which is configuration data of respective encrypted contents, and the content providing server provides the client with an encrypted content formed by combining range data as partial data of the encrypted contents specified by the content identifiers and the range information.

23 Claims, 20 Drawing Sheets

(56) References Cited

U.S. PATENT DOCUMENTS

| | | | |
|---|---|---|---|
| 2009/0019279 A1* | 1/2009 | Kato | 713/150 |
| 2009/0138714 A1* | 5/2009 | Matsushita et al. | 713/171 |
| 2009/0193252 A1* | 7/2009 | Wajs | 713/165 |
| 2009/0214042 A1* | 8/2009 | Nakahara et al. | 380/278 |
| 2009/0235303 A1* | 9/2009 | Yamaoka et al. | 725/31 |
| 2009/0282250 A1* | 11/2009 | Sato et al. | 713/171 |
| 2010/0008509 A1* | 1/2010 | Matsushita et al. | 380/279 |
| 2010/0205677 A1* | 8/2010 | Kawamoto et al. | 726/26 |
| 2011/0058675 A1* | 3/2011 | Brueck et al. | 380/277 |
| 2012/0089843 A1* | 4/2012 | Kato et al. | 713/176 |

* cited by examiner

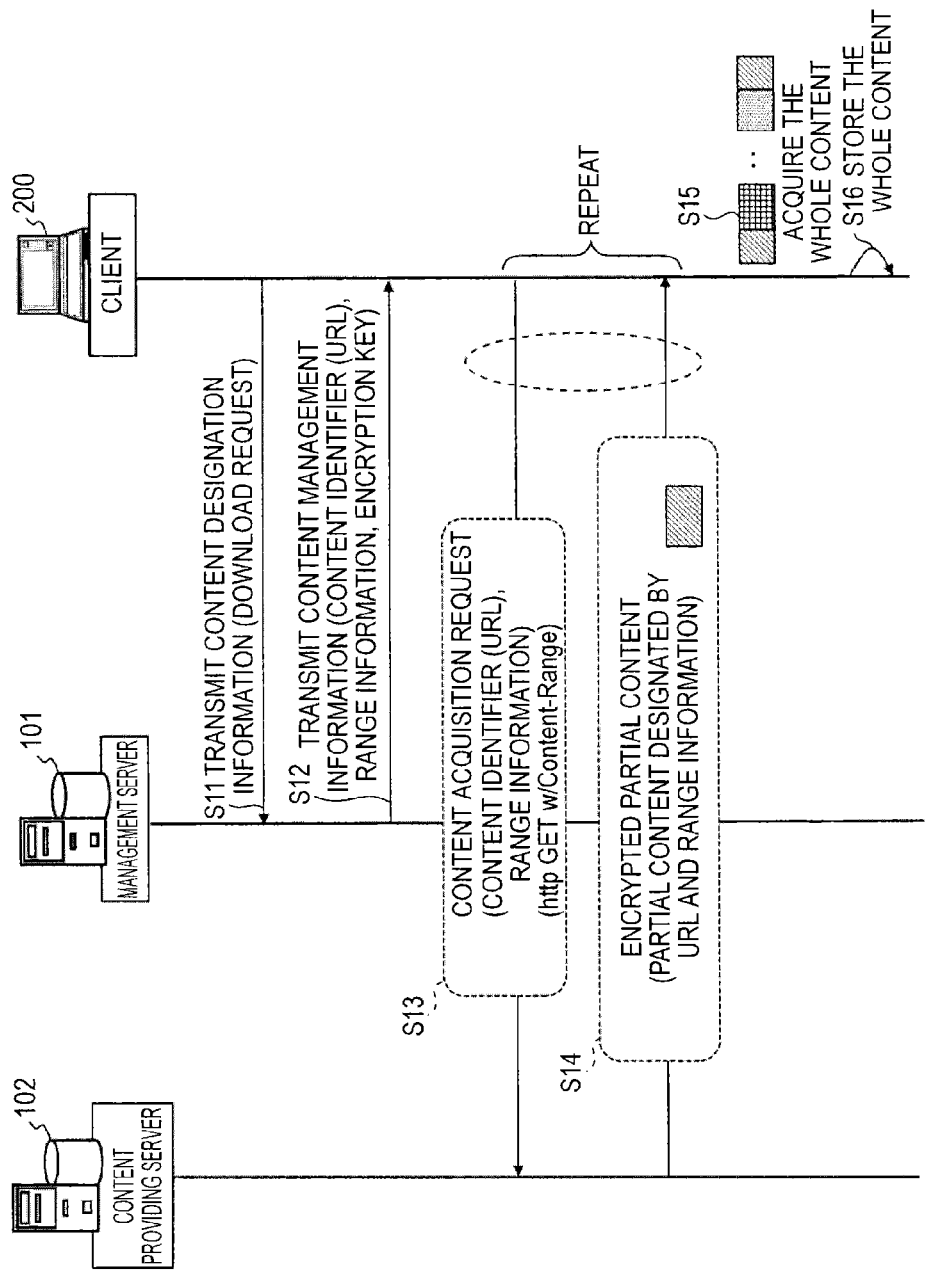

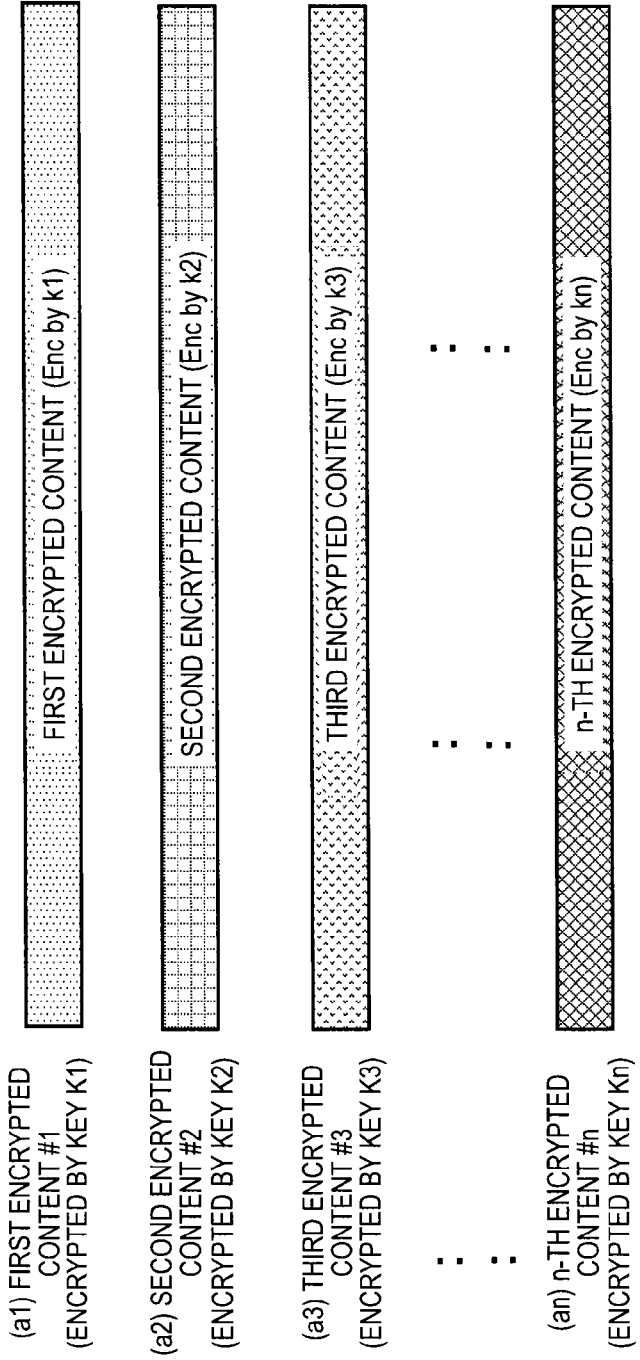

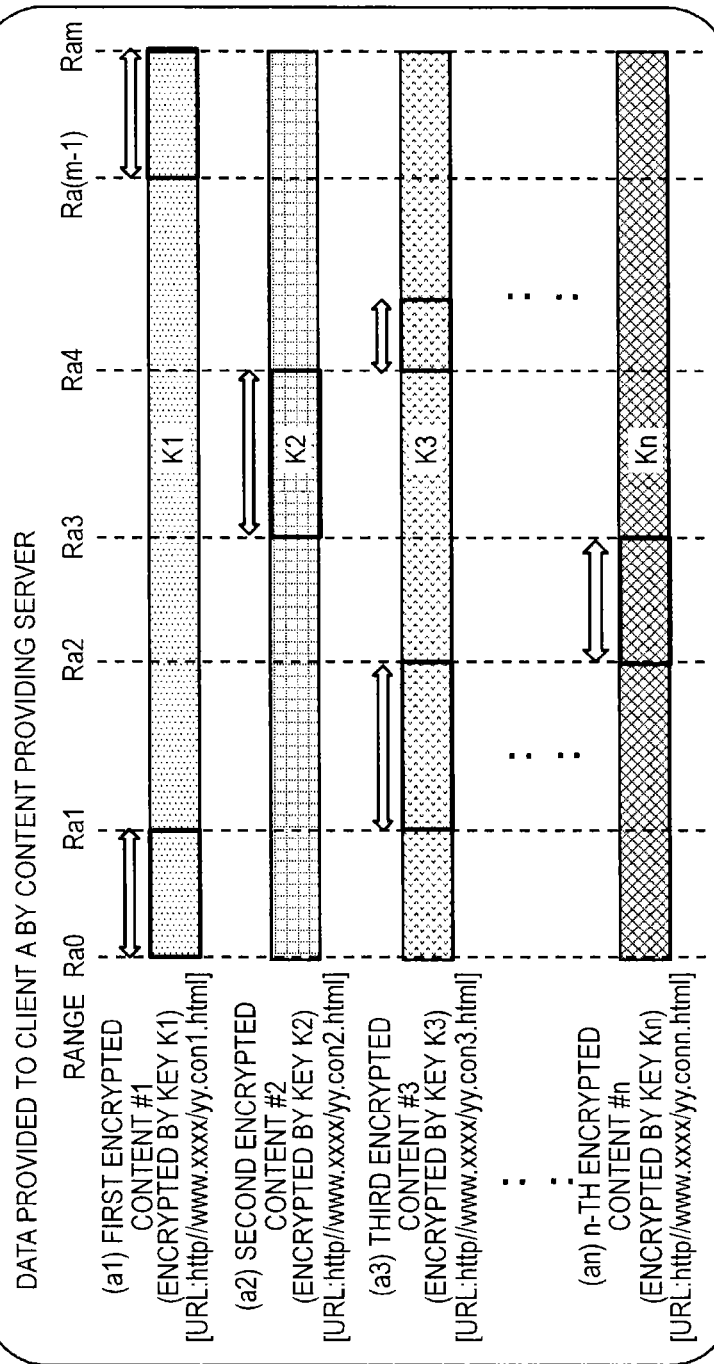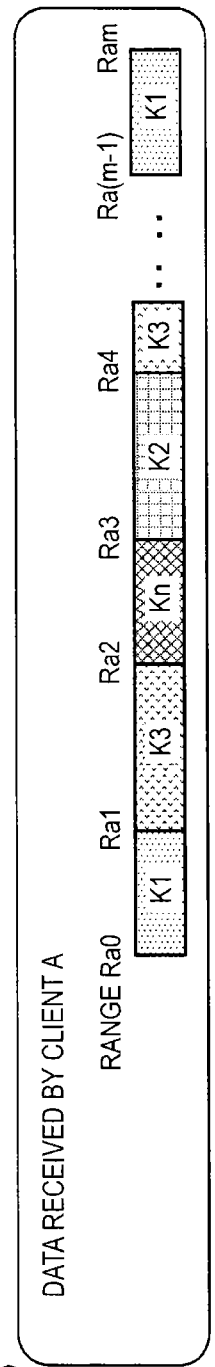
FIG. 7A
FIG. 7B

FIG.8

(c) CONTENT IDENTIFIER (URL) AND RANGE INFORMATION RECEIVED FROM MANAGEMENT SERVER BY CLIENT A AND TRANSMITTED TO CONTENT PROVIDING SERVER FROM CLIENT A

| CONTENT IDENTIFIER (URL) | RANGE INFORMATION |
|---|---|
| URL:http//www.xxxx/yy.con1.html (FIRST ENCRYPTED CONTENT #1) | Ra0~Ra1 |
| URL:http//www.xxxx/yy.con3.html (THIRD ENCRYPTED CONTENT #3) | Ra1~Ra2 |
| URL:http//www.xxxx/yy.conn.html (n-TH ENCRYPTED CONTENT #n) | Ra2~Ra3 |
| .. | .. |

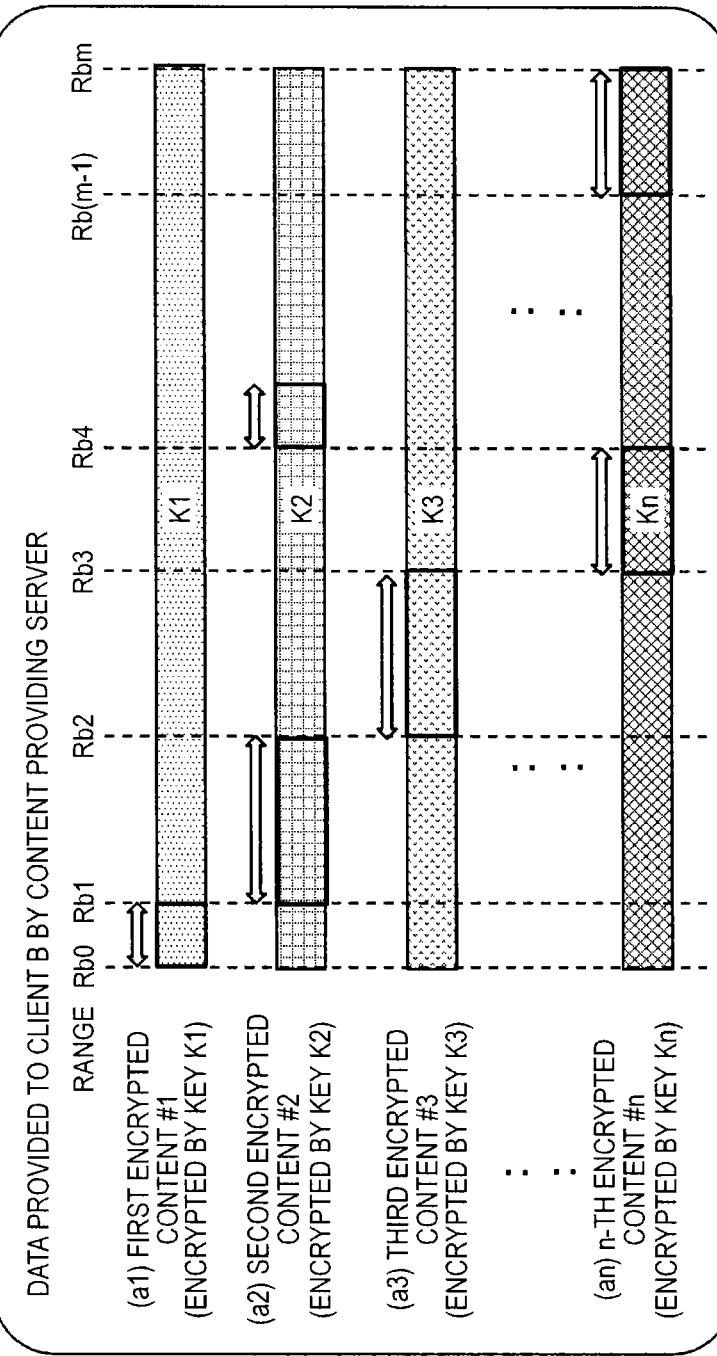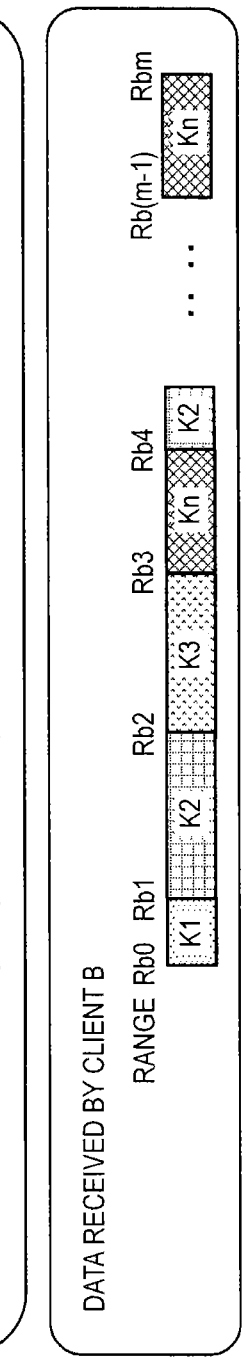

FIG.10

(c) CONTENT IDENTIFIER (URL) AND RANGE INFORMATION RECEIVED FROM MANAGEMENT SERVER BY CLIENT B AND TRANSMITTED TO CONTENT PROVIDING SERVER FROM CLIENT B

| CONTENT IDENTIFIER (URL) | RANGE INFORMATION |
|---|---|
| URL:http//www.xxxx/yy.con1.html (FIRST ENCRYPTED CONTENT #1) | Rb0~Rb1 |
| URL:http//www.xxxx/yy.con2.html (SECOND ENCRYPTED CONTENT #2) | Rb1~Rb2 |
| URL:http//www.xxxx/yy.con3.html (THIRD ENCRYPTED CONTENT #3) | Rb2~Rb3 |
| .. | .. |

FIG. 11

| | DELIVERY CONTENT INFORMATION | DELIVERY DESTINATION INFORMATION | DELIVERY USER | DELIVERY DATE INFORMATION | RANGE INFORMATION | DELIVERY ENCRYPTION KEY INFORMATION |
|---|---|---|---|---|---|---|
| (1) | ABC STORY | xyz@patnet.co.jp | SUZUKI ICHIRO | 2010.07.22 | #1:Ra1~Ra2,Rax~Ray<br>#2:Ra2~Ra3<br>#3:-<br>… | K1,K2,K3 … |
| (2) | ABC STORY | jkl@ynos.ne.jp | TANAKA KAORU | 2010.09.15 | #1:Rb1~Rb2<br>#2:-<br>#3:Rb2~Rb3,Rbx~Rby<br>… | K1,K3 … |
| .. | .. | .. | .. | .. | .. | .. |

FIG.18

| DELIVERY CONTENT INFORMATION | DELIVERY DESTINATION INFORMATION | DELIVERY USER | DELIVERY DATE INFORMATION | RANGE INFORMATION | DELIVERY ENCRYPTION KEY INFORMATION |
|---|---|---|---|---|---|
| ABC STORY | xyz@patnet.co.jp | SUZUKI ICHIRO | 2010.07.22 | #1:Ra1~Ra2,Rax~Ray<br>#2:Ra2~Ra3<br>#3: ...<br>..... | K11,K12,K23 ... |
| ABC STORY | jkl@ynos.ne.jp | TANAKA KAORU | 2010.09.15 | #1:Rb1~Rb2<br>#2:-<br>#3:Rb2~Rb3,Rbx~Rby<br>..... | K11,K32 ... |
| .. | .. | .. | .. | .. | .. |

INFORMATION PROCESSING SYSTEM AND METHOD FOR PROVIDING AUTHORIZED CONTENT

FIELD

The present disclosure relates to an information processing system, an information processing device, an information processing method and a program, and particularly relates to an information processing system, an information processing device, an information processing method and a program capable of preventing unauthorized use of contents.

BACKGROUND

In recent years, data communication through networks such as Internet is widely used and a great deal of image data, music data and so on is widely distributed through networks.

In many contents such as music data and image data, copyrights, distribution rights and so on are possessed by creators or sellers. Therefore, for example, when a service provider provides a user with a content from a server through a network, it is common to perform control so as to allow only users having a legitimate use right to use the content.

Specifically, for example, the control is performed so that the content is transmitted as an encrypted content which can be decrypted only by an encryption key provided to a user who has performed legitimate purchase processing of the content. However, even when the above control is performed, unauthorized use of the content by an unspecified number of users occurs in the case where, for example, the content decrypted by the user who has acquired the encrypted content or the encryption key is illegally distributed or published. Particularly in recent years, there are many cases that data is illegally published or distributed and how to prevent such unauthorized use is a big problem.

A specific example of illegal distribution of an encrypted key and a content will be explained with reference to a drawing.

FIG. 1 is a view showing an example of illegal publication of the encryption key. A content providing server 10 provides an encrypted content 11 encrypted by applying an encryption key 12 to a client A 21 and a client B 22 who have executed a legitimate content purchase procedure with the encryption key 12.

These client A 21 and the client B 22 can execute content reproduction by performing decryption of the encrypted content 11 applying the encryption key 12.

However, assume that the client B 22 publishes the encryption key 12, for example, in a website on a network to which anyone can access.

When the above processing of publishing the key is conducted, the published encryption key 31 can be acquired by an unspecified number of users.

As a result, the published encryption key 31 can be acquired through a network, for example, by an unauthorized user 23 who has not performed the legitimate content purchase processing, and further, a copy 32 of the encrypted content can be acquired from another client and so on, therefore, the unauthorized user 23 can decrypt the copy 32 of the encrypted content by applying the published encryption key 31 and perform reproduction of the content.

If such situation occurs, the unauthorized use of contents will be widespread.

In the example shown in FIG. 1, the same encryption key is provided to all clients, therefore, when one illegal user leaks the key, all contents provided to other clients can be decrypted by the illegal key. Additionally, it is difficult to specify the client who has illegally published the key.

As a method of solving the problem, a configuration in which an encrypted content to be provided to respective clients is encrypted by different encryption keys will be effective.

That is, as shown in FIG. 2, the content providing server 10 provides an encrypted content encrypted by applying an encryption key A 14 to a client A 24 with the encryption key A 14.

The content providing server 10 provides an encrypted content encrypted by applying an encryption key B 15 to a client B 25 with the encryption key B 15.

The content providing server 10 provides an encrypted content encrypted by applying an encryption key C 16 to a client C 16 with the encryption key C 16.

As the above setting is applied, if by some chance any of the encryption keys is leaked, the content which can be decrypted by the leaked key is limited to one encrypted content encrypted by the leaked key, and it is possible to specify a leakage source, namely, an illegal client who has published the encryption key.

However, it is necessary that the content providing server 10 generates encrypted contents different according to each client in order to change the encryption key in each client, which causes the problem of increasing a processing load on the server's side.

The examples explained with reference to FIG. 1 and FIG. 2 are examples in cases where illegal publication and leakage of the encryption key applied for encryption/decryption processing of the content are conducted, however, not only the encryption key but also the decrypted content can be a target for illegal publication or leakage.

FIG. 3 shows an example of illegal publication of the decrypted content.

The content providing server 10 provides the encrypted content 11 encrypted by applying the encryption key 12 to a client 28. The providing processing is executed as legitimate content purchase processing.

However, when the client 28 decrypts the encrypted content 11 by applying the encryption key 12 and illegally publishes the decrypted content 11, an illegally-published content 33 can be used by an unspecified number of users including an unauthorized user 29 shown in FIG. 3.

When the decrypted content is published as described above, unauthorized use of the decrypted content will be widespread and it is difficult to specify the client who has illegally published the encrypted content even when the encryption key is changed in each client.

SUMMARY

In view of the above, it is desirable to provide an information processing system, an information processing device, an information processing method and a program capable of preventing unauthorized use of contents.

It is also desirable to provide an information processing system, an information processing device, an information processing method and a program capable of preventing unauthorized use of contents without increasing a processing load of a server excessively.

An embodiment of the present disclosure is directed to an information processing system including a client executing acquisition and reproduction of a content, a management server providing the client with content selection information applied for acquisition of the content, and a content providing server receiving the content selection information from the client and providing the content selected in accordance with the content selection information, in which the content selection information includes content identifiers as identifiers of encrypted contents respectively encrypted by different encryption keys and range information indicating data areas of range data which is configuration data of respective encrypted contents, and the content providing server provides the client with an encrypted content formed by combining range data as partial data of the encrypted contents specified by the content identifiers and the range information.

In the information processing system according to the embodiment of the present disclosure, the content providing server may hold encrypted contents #1 to #n respectively encrypted by different encryption keys, may select encrypted contents corresponding to the content identifiers received from the client and may further extract range data specified by the range information from the selected encrypted contents to be provided to the client.

In the information processing system according to the embodiment of the present disclosure, the content providing server may hold encrypted contents #1 to #n each encrypted by one encryption key which is different according to each encrypted content, may select encrypted contents corresponding to the content identifiers received from the client and may further extract range data specified by the range information from the selected encrypted contents to be provided to the client.

In the information processing system according to the embodiment of the present disclosure, the content providing server may hold encrypted contents #1 to #n respectively encrypted by different plural encryption keys, may select encrypted contents corresponding to the content identifiers received from the client and may further extract range data specified by the range information from the selected encrypted contents to be provided to the client.

In the information processing system according to the embodiment of the present disclosure, the management server may generate different content selection information having different content identifiers and range information in each processing of providing the content selection information with respect to the client and may provide the information to the client.

In the information processing system according to the embodiment of the present disclosure, the management server may execute processing of generating management information in which the content selection information provided to the client is associated with client information of the client to which the content selection information has been provided and storing the information in a storage unit.

In the information processing system according to the embodiment of the present disclosure, the client may perform decryption processing by switching the encryption key in each range data with reference to the range information at the time of reproduction processing of the received content from the content providing server.

Another embodiment of the present disclosure is directed to an information processing device including a storage unit storing encrypted contents #1 to #n respectively encrypted by different plural encryption keys, a communication unit receiving content identifiers as identifiers of encrypted contents and range information indicating data areas of range data which is configuration data of respective encrypted contents from a client and a data processing unit selecting an encrypted content formed by combining range data as partial data of the encrypted content, which is specified by the content identifiers and the range information as data to be provided to the client.

Still another embodiment of the present disclosure is directed to an information processing device including a communication unit performing communication with a client executing acquisition and reproduction of contents and a data processing unit generating and providing content selection information applied for acquisition of contents in response to a content request from the client, in which the data processing unit generates different content selection information having different content identifiers and range information in each processing of providing the content selection information with respect to the client and provides the information to the client.

In the information processing device according to the embodiment of the present disclosure, the information processing device may execute processing of generating management information in which the content selection information provided to the client is associated with client information of the client to which the content selection information has been provided and storing the information in a storage unit.

Yet another embodiment of present disclosure is directed to an information processing device including a communication unit performing communication with a content providing server and a data processing unit transmitting content selection information including content identifiers as identifiers of encrypted contents respectively encrypted by different encryption keys and range information indicating data areas of range data which is configuration data of respective encrypted contents to the content providing server, receiving an encrypted content formed by combining range data as partial data of the encrypted contents specified by the content identifiers and the range information from the content providing server and storing the content in a storage unit.

In the information processing device according to embodiment of the present disclosure, the data processing unit may perform decryption processing by switching the encryption key in each range data with reference to the range information at the time of reproduction processing of the received content from the content providing server.

Still yet another the embodiment of present disclosure is directed to an information processing method executed in an information processing device which has a storage unit storing encrypted contents #1 to #n respectively encrypted by different plural encryption keys, the method including receiving content identifiers as identifiers of encrypted contents and range information indicating data areas of range data which is configuration data of respective encrypted contents from a client through a communication unit and selecting an encrypted content formed by combining range data as partial data of the encrypted contents specified by the content identifiers and the range information as data provided to the client by a data processing unit.

Further another embodiment of present disclosure is directed to an information processing method executed in an information processing device including generating and providing content selection information applied for acquisition of contents in response to a content request from a client executing acquisition and reproduction of contents by a data processing unit, in which the data processing is processing of generating different content selection information having different content identifiers and range information in each processing of providing the content selection information with respect to the client and provides the information to the client.

Still further another embodiment of present disclosure is directed to an information processing method executed in an information processing device including transmitting content selection information including content identifiers as identifiers of encrypted contents respectively encrypted by different encryption keys and range information indicating data areas of range data which is configuration data of respective encrypted contents to a content providing server, and receiving an encrypted content formed by combining range data as partial data of the encrypted contents specified by the content identifiers and the range information from the content providing server and storing the content in a storage unit.

Yet further another embodiment of present disclosure is directed to a program allowing an information processing device to execute information processing which has a storage unit storing encrypted contents #1 to #n respectively encrypted by different plural encryption keys including allowing the information processing device to receive content identifiers as identifiers of encrypted contents and range information indicating data areas of range data which is configuration data of respective encrypted contents from a client through a communication unit, and allowing a data processing unit to select an encrypted content formed by combining range data as partial data of the encrypted contents specified by the content identifiers and the range information as data provided to the client.

Still yet further another embodiment of present disclosure is directed to a program allowing an information processing device to execute information processing including allowing a data processing unit to generate and provide content selection information applied for acquisition of contents in response to a content request from a client executing acquisition and reproduction of contents, in which the data processing is processing of generating different content selection information having different content identifiers and range information in each processing of providing the content selection information with respect to the client and provides the information to the client.

A further embodiment of present disclosure is directed to a program allowing an information processing device to execute information processing including allowing the information processing device to transmit content selection information including content identifiers as identifiers of encrypted contents respectively encrypted by different encryption keys and range information indicating data areas of range data which is configuration data of respective encrypted contents to a content providing server and allowing the information processing device to receive an encrypted content formed by combining range data as partial data of the encrypted contents specified by the content identifiers and the range information from the content providing server and to store the content in a storage unit.

The program according to the embodiment of the present disclosure is a program which can be provided to, for example, an information processing device or a computer system capable of executing various program codes by recording media or communication media providing the program in a computer readable format. The program is provided in the computer readable format, thereby realizing processing in accordance with the program on the image processing device or the computer system.

Other characteristics and advantages of the present disclosure will be clear by detailed explanation based on later-described embodiments of the present disclosure and attached drawings. A system is defined in the specification as logical aggregate of plural devices and is not limited to a system in which devices of respective configurations are in the same casing.

According to the embodiments of the present disclosure, a configuration capable of preventing unauthorized use of contents can be realized.

Specifically, the content providing server executing processing of providing contents to the client provides the client with the encrypted content formed by combining range data as partial data of the encrypted contents specified by the content identifiers and the range information. The content selection information including content identifiers and range information is set as data different according to each client, and correspondence data between content selection information and clients is registered in a database as management information. When an illegally-distributed content is found out, it is possible to specify a source client by analyzing the range data, which can prevent unauthorized use of contents.

BRIEF DESCRIPTION OF THE DRAWINGS

FIG. 5 is a sequence diagram for explaining the whole sequence of processing according to an embodiment of the present disclosure;

FIG. 6 is a view for explaining an example of stored data of a content providing server;

FIGS. 7A and 7B are diagrams for explaining an example of data provided to a client by the content providing server;

FIG. 8 is a chart for explaining content identifiers and range information as content selection information;

FIGS. 9A and 9B are diagrams for explaining an example of data provided to a client by the content providing server;

FIG. 10 is a chart for explaining content identifiers and range information as content selection information;

FIG. 11 is a chart for explaining a data configuration example of management information generated and held by a management server;

FIG. 18 is a chart for explaining a data configuration example of management information generated and held by the management server;

DETAILED DESCRIPTION

Hereinafter, an information processing system, an information processing device, an information processing method and a program according to an embodiment of the present disclosure will be explained in detail with reference to the drawings. The explanation will be made in accordance with the following items.

1. Outline of Embodiment of Present Disclosure
   2. Examples of Stored Data and Content Providing Processing of Content Providing Server
   3. Management Information of Management Server
   4. Data Providing Processing Sequence From Management Server to Client
   5. Data Reception and Storage Processing Sequence in Client
   6. Content Reproduction Sequence in Client
   7. Source Determination Processing Sequence based on illegally-Distributed Content in Server
   8. Other Configuration Examples of Content Encryption
   9. Hardware Configuration of Respective Devices
   10. Brief of Configuration of Present Disclosure

[1. Outline of Embodiment of Present Disclosure]

Hereinafter, the information processing system, the information processing device, the information processing method and the program according to the embodiment of the present disclosure will be explained in detail with reference to the drawings.

First, an outline of the embodiment of the present disclosure will be explained with reference to FIG. 4. The present disclosure intends to prevent unauthorized use of contents, which is capable of specifying a transmission source of an illegal content distributed on a network, for example, when the content provided to respective clients is illegally distributed.

The present disclosure also intends to realize the above configuration without increasing a processing load of a server performing delivery of contents.

Figure 1:
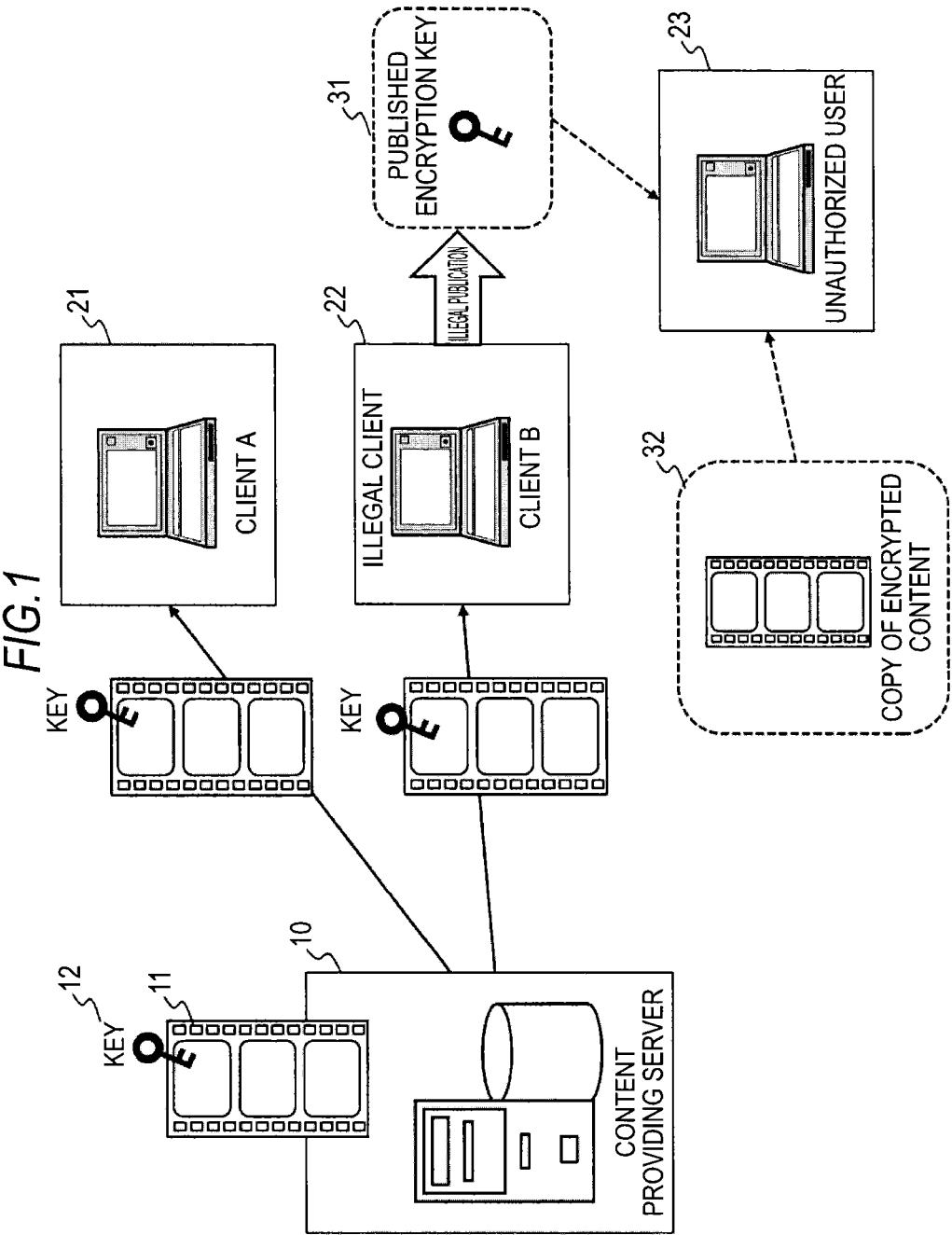
FIG. 1 is a view for explaining an example of unauthorized use of a content due to illegal publication of an encryption key.
Figure 2:
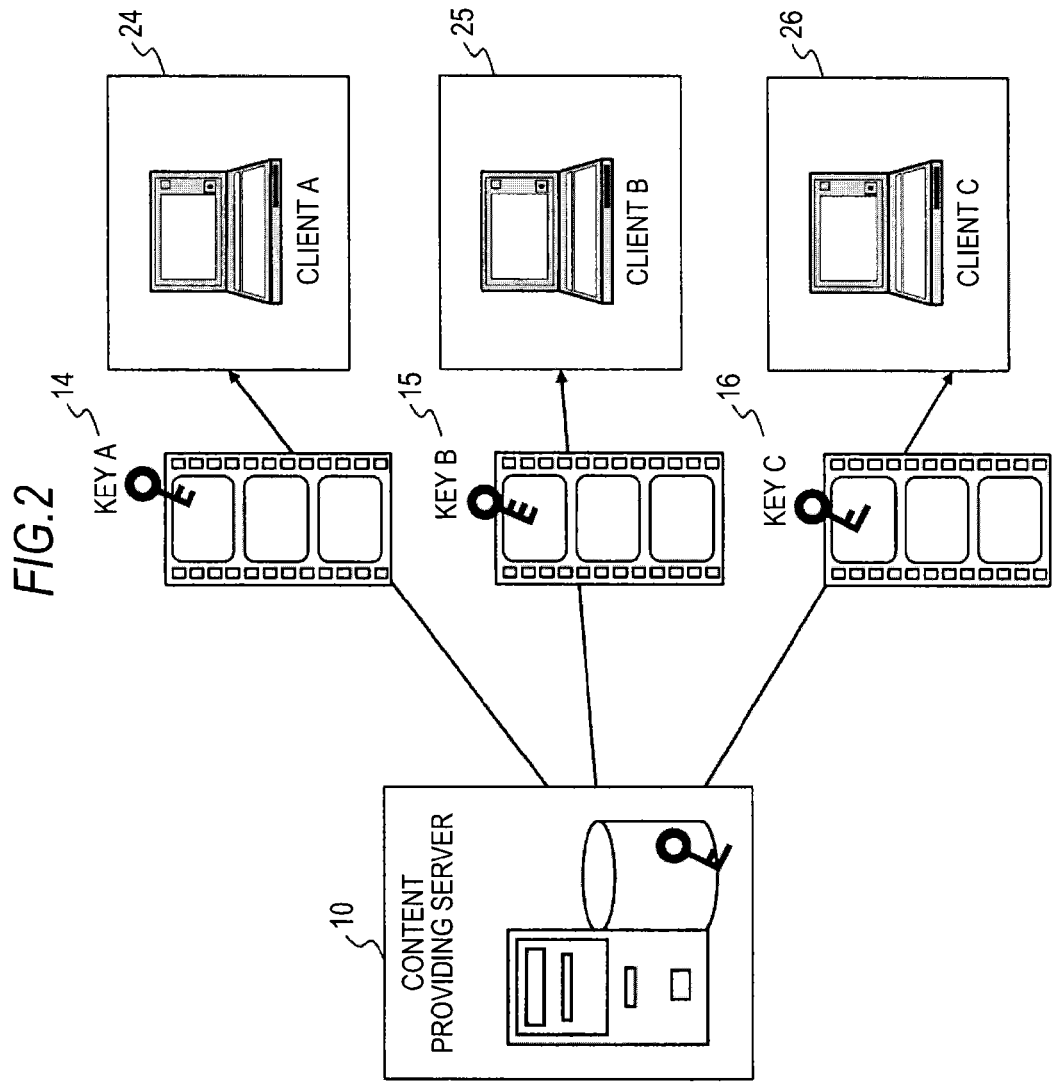
FIG. 2 is a view for explaining an example of unauthorized use of a content due to illegal publication of encryption keys.
Figure 3:
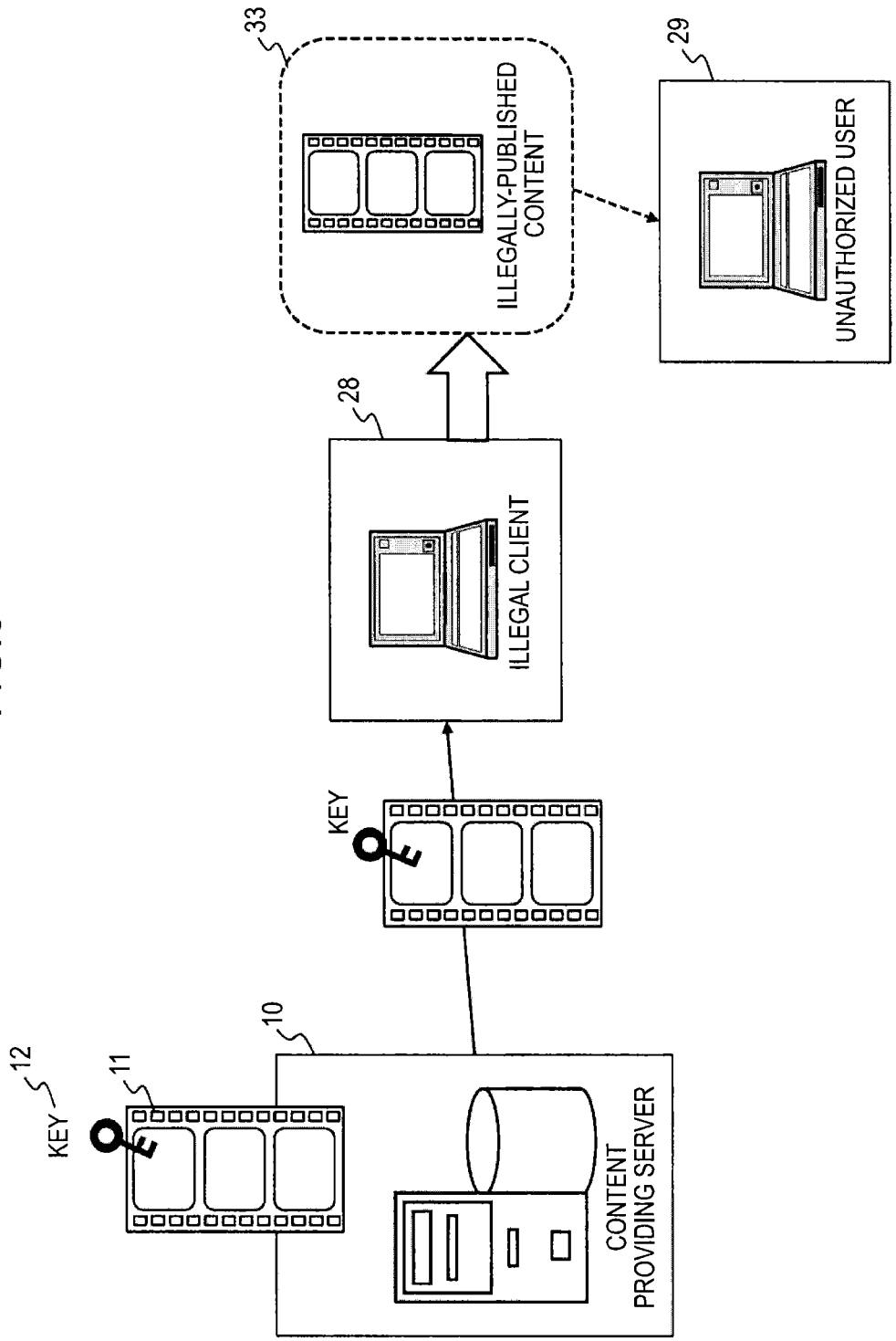
FIG. 3 is a view for explaining an example of unauthorized use of a content due to illegal publication of a decrypted content.
Figure 4:
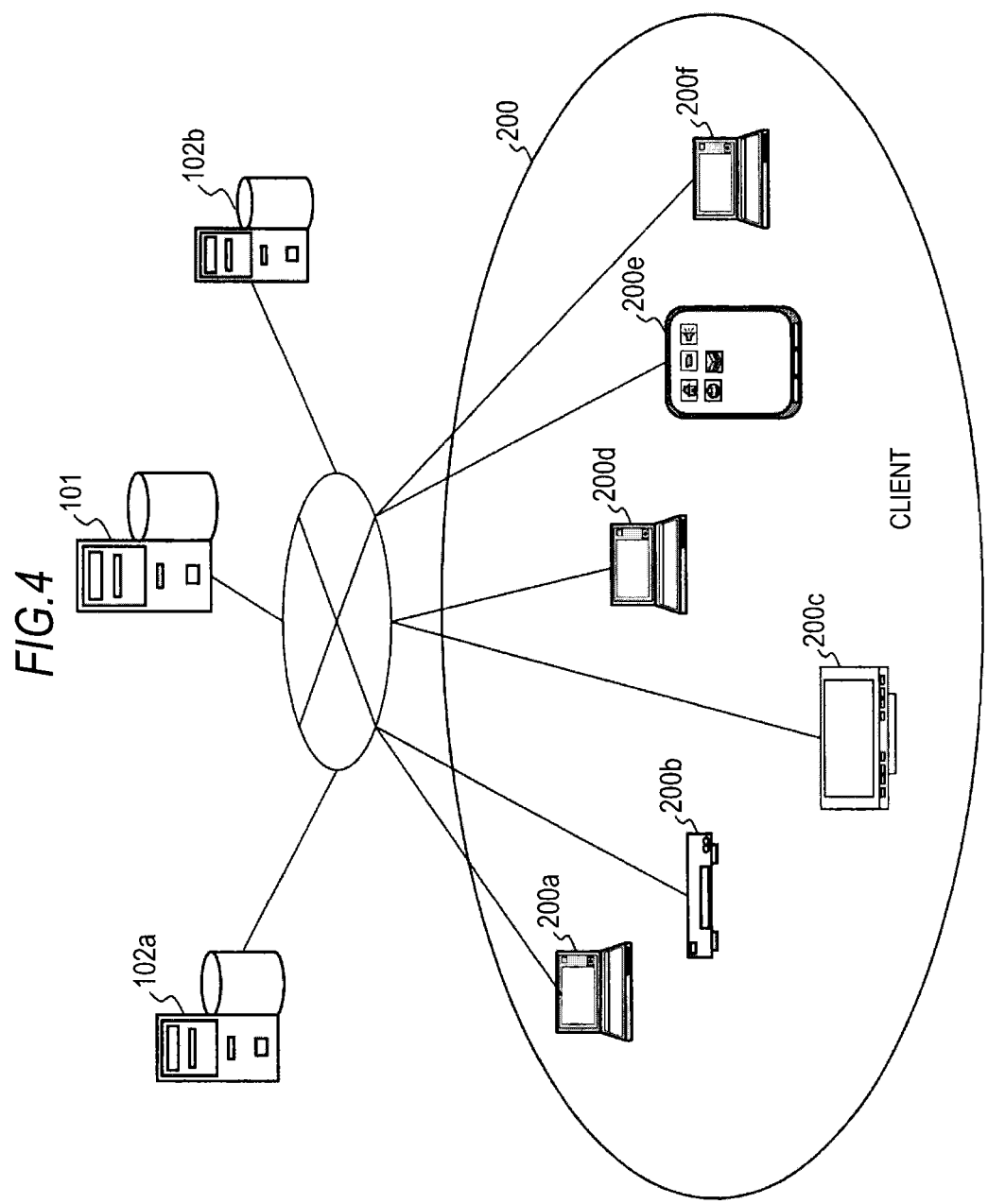
FIG. 4 is a view for explaining an outline of the present disclosure.

In FIG. 4, many clients 200 using contents such as movies and music are shown. The clients 200 include a PC, a television, a portable terminal and so on used by various users.

These clients are configured to connect to and perform communication with a management server 101 and a content providing server 102 through the network.

There are a variety of methods in processing of providing contents to clients. In the following embodiment, contents are provided to clients in accordance with processing described below as an example.

The management server 101 will be a window for receiving a content request from the client 200.

The management server 101 receives the content request from the client and transmits management information for acquiring the requested content, for example, a content URL as a content identifier and so on to the client 200.

The client 200 acquires (downloads) the content from the content providing server 102 by using the content URL and so on received from the management server 101.

That is, the content providing server 102 holds content data in the configuration of FIG. 4. The management server 101 does not hold content data, receiving the content request from the client 200 and providing the client with the client information and the like necessary for acquiring the content by the client 200.

The content providing server 102 is a cache server (or an edge server) forming, for example, a so-called CDN (Content Delivery Network). The content providing servers 102 are set by being distributed to, for example, respective areas.

Specifically, the content providing servers 102 are arranged by being distributed to respective locations such as Europe, North America, Japan and Asia, and are configured to acquire contents from the content providing server nearer to client of each area, or from the content providing server with reduced congestion.

Though two content providing servers 102a and 102b are shown in FIG. 4, a large number of content providing servers 102c, 102d, . . . exist in addition to the two servers.

A content providing sequence with respect to the client will be explained with reference to a sequence diagram shown in FIG. 5.

FIG. 5 shows, from the left, the content providing server 102 executing content providing processing, the management server 101 providing content management information necessary for content acquisition, reproduction processing and so on, and the client 200 acquiring the content to perform content use processing such as reproduction.

First, in Step S11, the client 200 transmits a content request (download request) with designation information of a content desirable to be acquired to the management server 101.

The management server 101 provides information of contents which can be acquired such as a content list to the client 200 through a communication network such as Internet. A user using the client 200 displays the list on a display of the client 200. When the user selects a certain content, selection information is transmitted to the management server 101.

Next, in Step S12, when the management server 101 receives content designation information from the client 200, the management server 101 generate content management information including content identifiers (for example, content URLs) for acquiring the designated content, range information and encryption keys applied for content decryption and provides (transmits) the information to the client 200.

Note that the range information is information for identifying ranges of partial contents included in the content, namely, information including partial content identification information.

The whole content is completed by combining plural partial contents corresponding to plural ranges.

Next, in Step S13, the client 200 transmits a content identifier (for example, a content URL) and range information received from the management server 101 to the content providing server 102. Specifically, the client 200 performs processing of acquiring a partial content on a range basis, for example, in which designation of [Content-Range] defined as http1.1 is performed.

In Step S14, the content providing server 102 executes processing of transmitting the partial content on a designated range basis to the client 200 in accordance with the content request received from the client 200.

The processing from Steps S13 to S14 is repeatedly executed number of times corresponding to the number of individual range designation information included in the range information provided from the management server 101 to the client 200.

According to the repeated processing, the client 200 acquires plural partial contents corresponding to plural ranges from the content providing server 102 to acquire the whole data of the content.

In Step S16, the client 200 stores the content including the acquired plural partial contents corresponding to plural ranges in a recording medium such as a hard disk. The client 200 also records the range information and the encryption keys with the content, which has been acquired from the management server 101 as management information corresponding to the stored content.

[2. Examples of Stored Data and Content Providing Processing of Content Providing Server]

Next, examples of stored data and content providing processing of the content providing server will be explained with reference to FIG. 6 and subsequent drawings.

The content providing server is a server for providing contents to clients.

As explained with reference to FIG. 4 and FIG. 5, the content identifiers (for example, URLs) and range information are inputted from the client, and the content providing server acquires partial contents corresponding to the designated ranges from the contents corresponding to the content identifiers to be provided to the client.

FIG. 6 is a diagram showing an example of data stored in a storage unit such as a database in one content providing server 102.

As shown in FIG. 6, the content providing server 102 stores plural encrypted contents (a1) to (an).

All the n-pieces of contents are encrypted contents obtained by encrypting the same content to be reproduced such as a movie using different encryption keys (K1 to Kn).

For example, n-pieces of encrypted contents obtained by individually encrypting certain one movie content using different n-pieces of encryption keys (K1 to Kn) in the storage unit.

Data shown in FIG. 6 indicates only an encrypted content group (a1) to (an) as server-stored data corresponding to one content, however, the content providing server 102 stores plural encrypted contents respectively encrypted by plural encryption keys so as to correspond to respective contents.

Data (a1) to (an) shown in FIG. 6 include the following encrypted contents (#1 to #n) encrypted by different encryption keys (K1 to Kn) with respect to one content.

(a1) First encrypted content #1 encrypted by the encryption key K1

(a2) Second encrypted content #2 encrypted by the encryption key K2

(a3) Third encrypted content #3 encrypted by the encryption key K3

. . . .

(an) n-th encrypted content #n encrypted by the encryption key Kn

All these n-pieces of encrypted contents #1 to #n are contents obtained by encrypting the same content applying different encryption keys (K1 to Kn).

The content providing servers 102a, 102b, . . . shown in FIG. 4 respectively store the encrypted contents (a1) #1 to (an) #n shown in FIG. 6.

Next, patterns of contents to be provided to the client from the content providing server will be explained with reference to FIGS. 7A, 7B and FIG. 8.

As previously explained with reference to the sequence diagram of FIG. 5, the content identifiers (for example, URLs) and range information are inputted from the client 200 and the content providing server 102 acquires partial contents corresponding to the designated ranges from the contents corresponding to the content identifiers to be provided to the client 200.

FIGS. 7A and 7B are diagrams for explaining an example of contents to be provided to a certain client A. FIG. 7A shows data provided to the client A by the content providing server, and FIG. 7B shows data received by the client A.

In the plural encrypted contents (a1) #1 to (an) #n shown in "Data provided to the client A by the content providing server" of FIG. 7A, arrow-ranges indicate data selected in accordance with the range information transmitted to the content providing server from the client A. That is, partial data in the ranges prescribed by the arrow-ranges in the encrypted contents (a1) #1 to (an) #n is selected and provided to the client A.

In the example shown in FIG. 7A, range data as prescribed partial data is extracted from respective encrypted contents #1 to #n and provided to the client A as described below.

(a1) a range Ra0 to Ra1 of the first encrypted content #1 encrypted by the encryption key K1 in the range Ra0 to Ra1 which is partial data of the content (a3) a range Ra1 to Ra2 of the third encrypted content #3 encrypted by the encryption key K3 in the range Ra1 to Ra2

(an) a range Ra2 to Ra3 of the n-th encrypted content #n encrypted by the encryption key Kn in the range Ra2 to Ra3

. . . .

(a1) a range Ra (m−1) to Ram of the first encrypted content #1 encrypted by the encryption key K1 in the range Ra(m−1) to Ram The processing of selecting partial contents is executed based on the content identifiers (URLs) and the range information received from the management server 101 and transmitted to the content providing server 102 by the client 200.

FIG. 8 shows the example of information received from the management server 101 and transmitted to the content providing server 102 by the client A.

The content identifiers (URL) and the range information shown in FIG. 8 are data corresponding to partial contents selected by arrows in FIG. 7A.

As shown in FIG. 8, the client A transmits the following content identifiers and the range information to the content providing server.

URL of the first encrypted content #1: Range Ra0 to Ra1

URL of the third encrypted content #3: Range Ra1 to Ra2

URL of the n-th encrypted content #n: Range Ra2 to Ra3

. . . .

For example, the whole data of a certain movie content is divided into m-pieces of ranges [(Ra0 to Ra1) to (Ra (m−1) to Ram)] and the content providing server selects respective range data in accordance with the content identifiers (URLs) and the range information inputted from the client and provides the information to the client.

The content providing server receives content identifier (URLs) and the range information shown in FIG. 8 from the client A and executes data selection shown in FIG. 7A in accordance with the received data to be provided to the client.

The processing of S13 and S14 in the sequence diagram shown in FIG. 5 for one time corresponds to the processing of selectively transmitting one partial content by transmission of one content identifier (URL) and range information.

For example, in the case where the whole content is divided into m-pieces of ranges as shown in FIG. 7A, the processing of Step S13 and S14 is executed with respect to each range and the client can acquire the whole data of m-pieces of ranges (partial contents) forming one content by repeating the processing m-times.

As a result, the client A will receive data shown in FIG. 7B. The encrypted content includes the following range data (partial contents):

the first encrypted content #1 is in range Ra0 to Ra1, the third encrypted content #3 is in range Ra1 to Ra2, the n-th encrypted content #n is in the range Ra2 to Ra3, . . . and the first encryption content #1 is in the range Ra(m−1) to Ram.

The whole encrypted content such as a movie is formed by the m-pieces of range data.

However, the encryption keys (K1 to Kn) differ according to each range in these contents, and it is necessary to decode the content by switching the encryption keys according to ranges at the time of reproducing the content.

A content reproduction sequence will be explained in a later stage.

The example of content providing processing to the client A has been explained with reference to FIGS. 7A, 7B and FIG. 8. The range information is set so as to differ according to each delivery of the content, namely, according to the client.

The content identifiers (URLs) and the range information are information to be provided to the client from the management server in Step S12 in the sequence diagram shown in FIG. 5.

The information is provided to respective clients as setting different according to each client in the management server as well as registered in the management server as management information.

FIGS. 9A, 9B and FIG. 10 are diagrams for explaining the content providing processing and content selection information (content identifiers (URLs) and range information) with respect to a client B different from the client A previously explained with reference to FIGS. 7A, 7B and FIG. 8.

FIG. 9A show data provided to the client B by the content providing server, and FIG. 9B shows data received by the client B in the same manner as FIGS. 7A and 7B previously explained.

In the plural encrypted contents (a1) #1 to (an) #n shown in "(a) Data provided to the client B by the content providing server" of FIG. 9A, arrow-ranges indicate data selected in accordance with the range information transmitted to the content providing server from the client B. That is, partial data in the ranges prescribed by the arrow-ranges in the encrypted contents (a1) #1 to (an) #n is selected and provided to the client B.

In the example shown in FIG. 9A, range data as prescribed partial data is extracted from respective encrypted contents #1 to #n and provided to the client B as described below:

(a1) a range Rb0 to Rb1 of the first encrypted content #1 encrypted by the encryption key K1 is the range Rb0 to Rb1 which is partial data of the content, (a2) a range Ra1 to Ra2 of the second encrypted content #2 encrypted by the encryption key K2 in the range Rb1 to Rb2, (a3) a range Rb2 to Rb3 of the third encrypted content #3 encrypted by the encryption key K3 in the range Rb2 to Rb3,

. . . .

(an) a range Rb (m−1) to Rbm of the n-th encrypted content #n encrypted by the encryption key Kn in the range Rb (m−1) to Rbm.

As a result, the client B will receive data shown in FIG. 9B. The encrypted content includes the following range data (partial contents):

the first encrypted content #1 is in range Ra0 to Ra1, the second encrypted content #2 is in range Ra1 to Ra2, the third encrypted content #3 is in the range Ra2 to Ra3, . . . and the n-th encrypted content #n is in the range Rb(m−1) to Rbm.

The whole encrypted content such as a movie is formed by the m-pieces of range data.

As can be seen by comparing FIGS. 9A, 9B with FIGS. 7A, 7B, the selection state of range data shown in FIGS. 9A, 9B is different from the selection state of range data shown FIGS. 7A and 7B. This is because content selection information (content identifiers (URLs) and range information) received from the management server 101 and transmitted to the content providing server 102 by each client differs according to each client.

FIG. 10 shows content selection information (content identifiers (URLs) and range information) applied for content selection processing with respect to the client B explained with reference to FIGS. 9A and 9B.

As shown in FIG. 10, the client B transmits the following content identifiers (URLs) and range information to the content providing server.

URL of the first encrypted content #1: Range Rb0 to Rb1,

URL of the second encrypted content #2: Range Rb1 to Rb2,

URL of the third encrypted content #3: Range Rb2 to Rb3

. . . .

The content selection information having the above setting is received from the management server and is transmitted to the content providing server.

The content management server executes content extraction processing by the selection of range data explained with reference to FIGS. 9A and 9B based on the content selection information (content identifiers (URL) and range information) received from the client B and provides the content including the extracted range data to the client B.

As described above, the management server sets different content selection information (content identifiers (URL) and range information) in accordance with content requests from respective clients to be transmitted to the clients.

The content providing server provides respective clients with the contents including range data having different combinations in accordance with the content selection information (content identifiers (URL) and range information) received from respective clients.

[3. Management Information of Management Server]

As described above, the management server sets different content selection information (content identifiers (URL) and range information) in accordance with content requests from respective clients to be transmitted to the clients.

The management server holds the information to be transmitted to respective clients in a storage unit (database) as content management information.

Data recorded by the management server as management information of delivery contents will be explained with reference to FIG. 11.

FIG. 11 is a data configuration example of management information held in a storage unit of the management server.

As shown in FIG. 11, management information includes, for example, the following information:

delivery content information, delivery destination information, delivery user information, delivery date information, range information and delivery encryption key information.

The delivery content information includes information such as content titles and content IDs.

The delivery destination information is information of addresses of content delivery destinations, for example, addresses corresponding to clients or users.

The delivery user information is user information such as user names, addresses and contact addresses.

The delivery date information is information of delivery dates of contents.

Range information is data in which encrypted contents (#1 to #n) and ranges provided to respective clients are recorded.

In the example of FIG. 11, transmission of the following data is registered with respect to a client of Entry (1):

Encrypted content (#1): Ranges Ra1 to Ra2, and Rax to Ray,

Encrypted content (#2): Range Ra2 to Ra3

. . . .

Transmission of the following data is registered with respect to a client of Entry (2):

Encrypted content (#1): Ranges Rb1 to Rb2,
Encrypted content (#3): Ranges Rb2 to Rb3, Rbx to Rby
....

For example, when an illegally-distributed content is found out, the management server analyzes range data included in the illegally-distributed content and checks the data with the management information to thereby extract an entry having a corresponding range data pattern. It is possible to specify a client registered in the extracted entry as a source of the illegally-distributed content.

The delivery encryption key information records information of encryption keys applied for encryption processing of respective provided contents. Specifically, the combination of range data provided to respective clients differs as explained with reference to FIGS. 7A, 7B and FIGS. 9A, 9B, and encryption keys necessary to decryption of range data also differ according to each combination of range data. Therefore, the combination of encryption keys provided to respective clients also differs. Accordingly, for example, when the keys are illegally distributed, it is possible to check the combination of illegally-distributed keys with registration information of management information to specify the source of the key.

The example of management information shown in FIG. 11 is an example, and it is not always necessary to record all the information. It is also preferable to hold information other than the shown information as management information.

[4. Data Providing Processing Sequence from Management Server to Client]

Next, a data providing processing sequence from the management server to a client will be explained with reference to a flowchart shown in FIG. 12.

Figure 12:
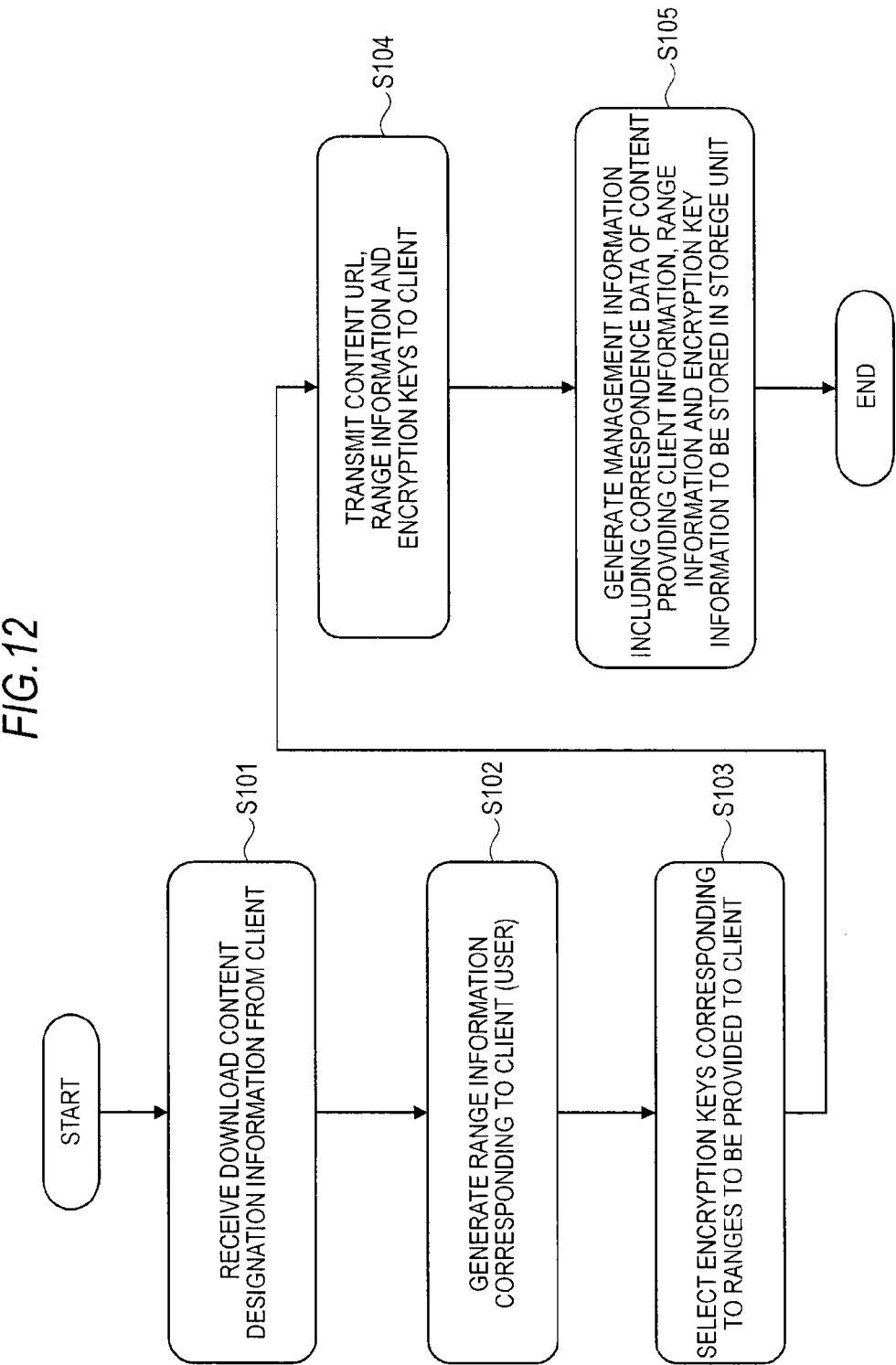
FIG. 12 is a flowchart for explaining a processing sequence of the management server.

The processing performed in accordance with the flow shown in FIG. 12 is executed by a data processing unit of the management server. The processing is executed in accordance with a program previously stored in, for example, the storage unit.

First, in Step S101, download content designation information is received from the client.

The content designation information is data including, for example, a content identifier selected by the user on the client's side in accordance with the content list including various movies and music provided by the management server.

Next, in Step S102, the management server generates range information corresponding to the client (user). The range information corresponds to the range information explained with reference to FIGS. 7A, 7B and FIGS. 9A, 9B which is the range information registered in the management information shown in FIG. 11.

That is, the data includes combined information of partial contents (range data) provided to the client concerning respective plural encrypted contents (#1 to #n) set so as to correspond to the content.

Specifically, for example, range information including combination of range data of the following respective encrypted contents is generated.

Encrypted content (#1): Ranges Ra1 to Ra2, Rax to Ray
Encrypted content (#2): Range Ra2 to Ra3
....

When all range data is combined, data of the whole content such as one movie can be reproduced.

In Step S103, encryption keys corresponding to range data to be provided to the clients are selected in Step S103.

For example, the encryption keys (K1 to Kn) corresponding to encrypted contents (#1 to #n) in which the range data selected in Step S102 is set are selected.

Next, in Step S104, the content identifiers (for example, URLs) corresponding to the encrypted contents (#1 to #n) in which the range data selected in Step S102 is set, range information, namely, data for identifying ranges and the encryption keys selected in Step S103 are transmitted to the client.

Lastly, in Step S105, management information including correspondence data of the content providing client information, the range information and the encryption key information is generated to be stored in the storage unit. Specifically, the management information previously explained with reference to FIG. 11 is generated to be stored in the storage unit.

[5. Data Reception and Storage Processing Sequence in Client]

Next, processing executed on the client's side, namely, a data reception and storage processing sequence in the client from the management server and the content providing server will be explained with reference to a flowchart of FIG. 13.

Figure 13:
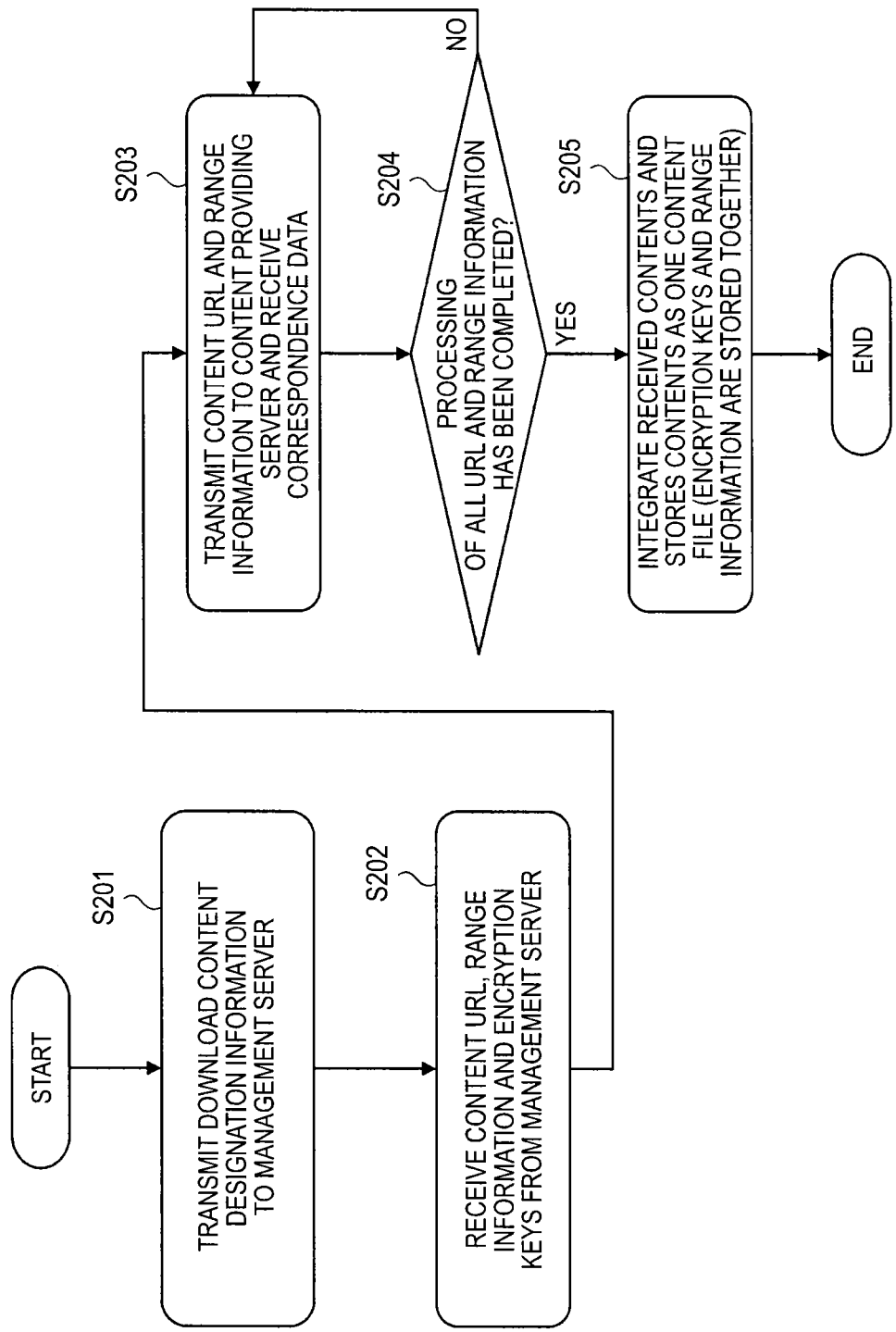
FIG. 13 is a flowchart for explaining a data acquisition sequence by a client.

The processing performed in accordance with the flow shown in FIG. 13 is executed in a data processing unit of the client such as a PC. The processing is executed in accordance with a program previously stored in the storage unit.

First, in Step S201, download content designation information is transmitted to the management server.

The content designation information is data including, for example, a content identifier selected by the user on the client's side in accordance with the content list including various movies and music provided by the management server.

Next, in Step S202, the following data is received from the management server:
content identification information (URL),
range information,
encryption keys.

The above is the data generated by the management server with respect to each client in the processing of Step S102 to S103 as the processing of the management server previously explained with reference to the flow of FIG. 12, which is data different according to each client.

Next, the client transmits the content selection information (content identifiers (URLs) and range information) received from the management server to the content providing server and receives correspondence data in Step S203.

The processing corresponds to processing of Steps S13 to S14 of the sequence diagram of FIG. 5.

Specifically, the content selection information (content identifiers (URLs) and range information) explained with reference to, for example, FIG. 8 and FIG. 10 is sequentially transmitted to the content providing server and receives correspondence data.

Next, the client determines whether the processing concerning all data of the range information received from the management server has been completed or not in Step S204. That is, the client determines whether all range data forming the content has been received from the content providing server or not.

When the processing has not been completed, the processing of Step S203 is repeatedly executed.

When it is determined that all processing has been completed, the process proceeds to Step S205.

Lastly, the client integrates the range data (partial contents) received from the content providing server and stores the data in the storage unit as one content file in Step S205.

The encryption keys and the range information received from the management server are also stored so as to be associated with the content file as management data.

[6. Content Reproduction Sequence in Client]

Next, a content reproduction sequence to be executed by the client who has stored the content in the storage unit in accordance with the flowchart of FIG. 13 will be explained with reference to a flowchart shown in FIG. 14.

Figure 14:
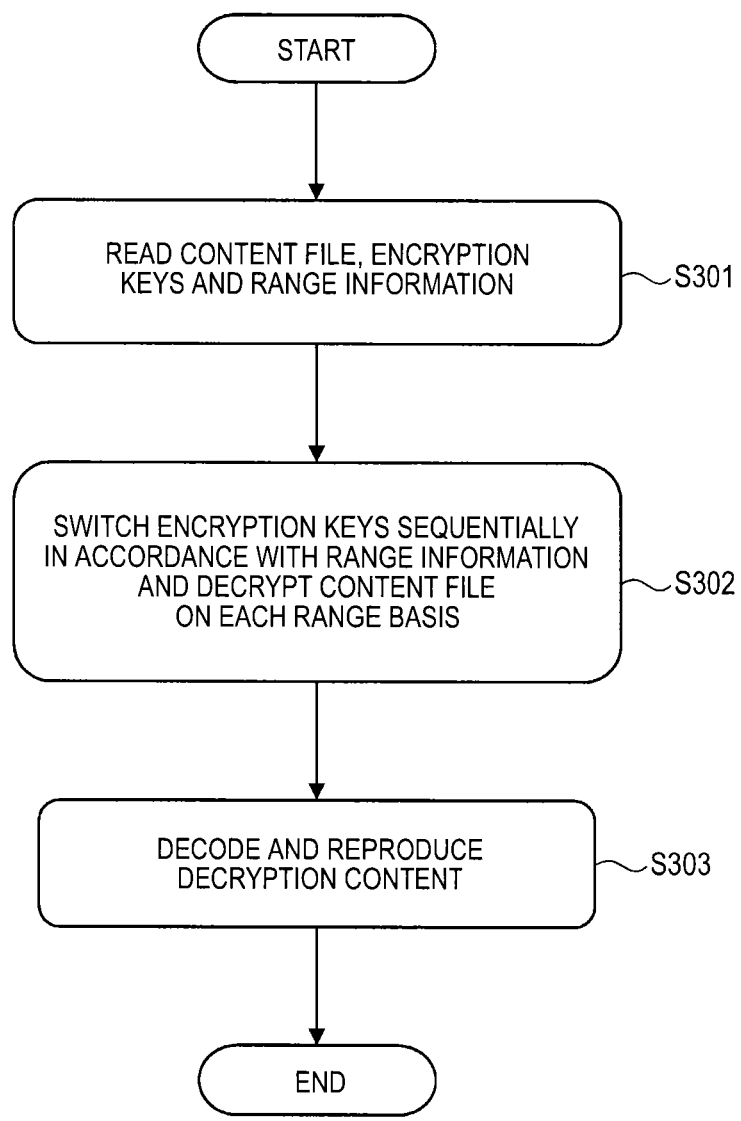
FIG. 14 is a flowchart for explaining a content reproduction sequence by a client.

The processing performed in accordance with the flow shown in FIG. 14 is executed in the data processing unit of the client such as a PC. For example, the processing is executed in accordance with a program previously stored in the storage unit.

First, in Step S301, the client executing content reproduction processing reads the content file and the range information stored in the storage unit.

Next, in Step S302, the client reads encryption keys of respective range data from the storage unit in accordance with the read range data and decrypts the range data to thereby reproduce the content.

As shown, for example, in FIG. 7B and FIG. 9B which have been previously explained, the content received from the content providing server by the client is formed by a combination of partial contents (range data) included in the content such as a movie.

Each ranges of the range data have different encryption keys (K1 to Kn) according to encrypted contents (#1 to #n) in which the range data is set.

Accordingly, the client executing the content reproduction processing executes switching of encryption keys applied for data decryption on a basis of each range data. The range information received from the management server is applied in the processing.

In Step S303, data decrypted by the encryption keys corresponding to respective range data is decoded and reproduced.

As described above, the client executing content reproduction selects encryption keys corresponding to respective range data with reference to range information to perform decryption and reproduction processing.

[7. Source Determination Processing Sequence Based on Illegally-Distributed Content in Server]

Next, a source determination processing sequence executed when an illegally distributed content is found out will be explained with reference to a flowchart shown in FIG. 15.

Figure 15:
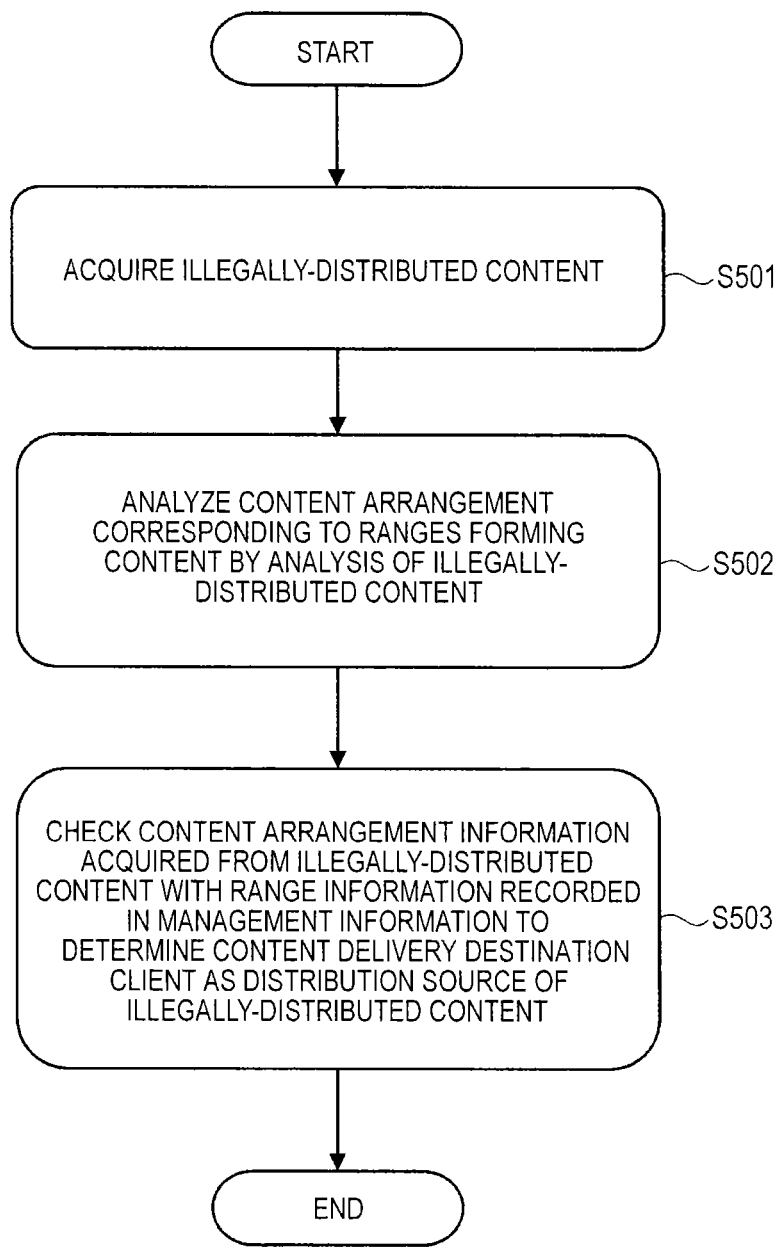
FIG. 15 is a flowchart for explaining a sequence of verifying illegal distribution by the management server.

The processing performed in accordance with the flow of FIG. 15 is executed in, for example, the data processing unit of the management server.

First, in Step S501, an illegally-distributed content is acquired.

The illegally-distributed content is, for example, a content which can be downloaded freely from a website to which anyone on the network can access, a copy content recorded in a disk illegally distributed and so on.

Next, in Step S502, the arrangement of range data forming the content is analyzed by analysis of the illegally-distributed content.

Next, in Step S503, range data arrangement information acquired from the illegally distributed content is checked with the range information recorded in the management information to determine a content delivery destination client which is a distribution source of the illegally-distributed content.

The management information indicates the previously-explained management information shown in FIG. 11.

In the flow shown in FIG. 15, the example of analysis processing of range data arrangement based on the illegally-distributed content has been explained. It is also possible to perform processing of finding out a source of illegally-distributed keys by checking a set of keys which are illegally distributed with registered information in the management information shown in FIG. 11.

[8. Other Configuration Examples of Content Encryption]

In the previously-explained example, the example of performing processing by setting encrypted contents (#1 to #n) applying plural different keys (K1 to Kn) in the whole content of a certain content such as a movie has been explained as shown, for example, FIGS. 7A, 7B and FIGS. 9A, 9B.

That is, in the above-described example, an encrypted content #x is a content obtained by encrypting the whole content by one encrypted key kx.

The encryption configuration can be more complicated and it is also preferable to set one encrypted content #x as a combination of data applying plural encrypted keys.

The processing example will be explained with reference to FIGS. 16A, 16B and subsequent drawings.

Figure 16:
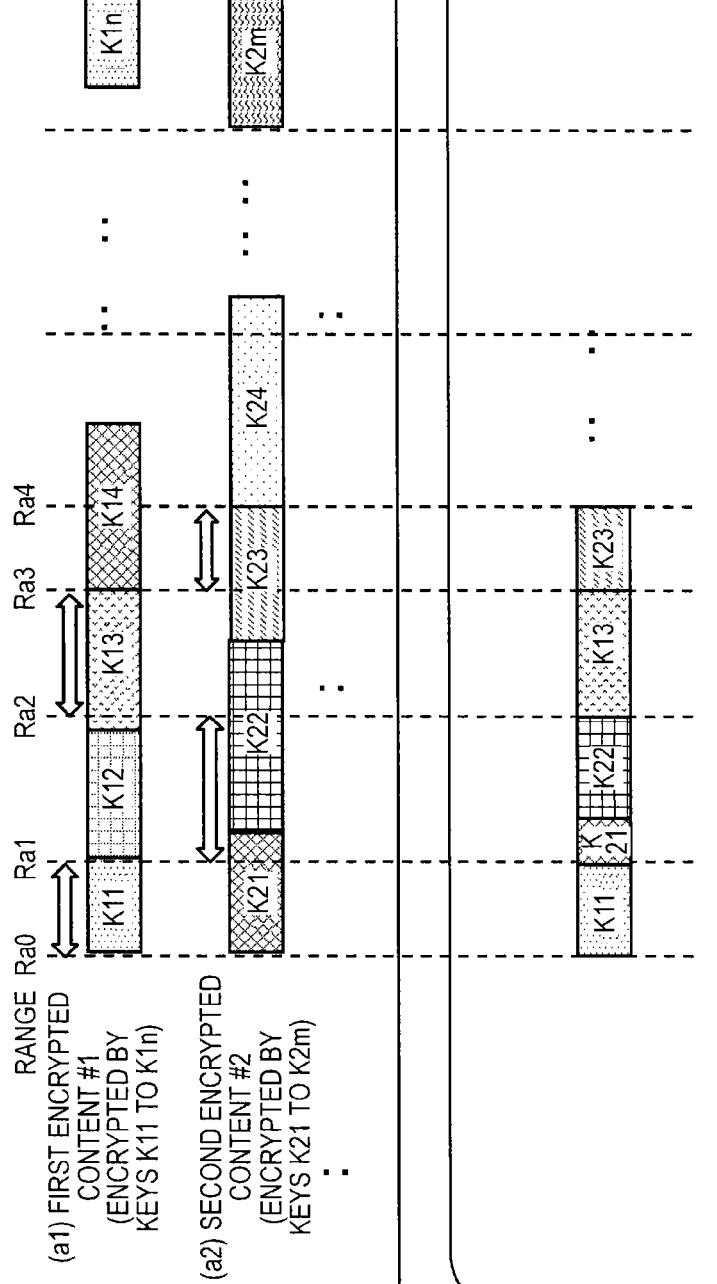
FIGS. 16A and 16B are diagrams for explaining an example of data provided to a client by the content providing server.

FIG. 16A shows data held by the content providing server and provided to the client A and FIG. 16B shows data received by the client A in the same manner explained in the above embodiments shown in FIGS. 7A, 7B and FIGS. 9A, 9B.

Plural encrypted contents (a1) #1 to (an) #n shown in "data held by the content providing server and provided to the client A" of FIG. 16A have a configuration in which one encrypted content (#x) is encrypted by plural encryption keys in respective partial data, which is different from the configuration of the encrypted contents (a1) #1 to (an) #n previously explained with reference to FIGS. 7A, 7B and FIGS. 9A, 9B.

For example:

(a1) the encrypted content #1 is formed by combination of encrypted data to which encryption is performed in respective partial contents by encryption keys K11 to K1n.

(a2) the encrypted content #2 is formed by combination of encrypted data to which encryption is performed in respective partial contents by encryption keys K21 to K2m.

Accordingly, in the present embodiment, each encrypted content (#x) is a combination of encrypted data applying plural encryption keys.

Also in this processing example, the client receives the similar data to the above embodiments from the management server, that is:

content identifiers (URLs), range information and encryption keys.

In the example, the number of encryption keys provided from the management server to the client is increased.

The same processing as the processing previously explained is performed concerning the content selection information (content identifiers (URLs) and range information) transmitted from the client to the content providing server, and the content selection after that by the content providing server is executed as the same processing as the previous embodiment.

For example, arrow-ranges in FIG. 16A indicate data selected in accordance with range information transmitted from the client A to the content transmission server. That is, partial data in ranges prescribed by the arrow-ranges in the encrypted contents (a1) #1 to (an) #n is selected and provided to the client A.

In the example shown in FIG. 16A, range data as prescribed partial data is extracted from respective encrypted contents #1 to #n and provided to the client A as described below:

(a1) encrypted data of the first encrypted content #1 encrypted by the encryption key K11 in the range Ra0 to Ra1 which is partial data of the content, (a2) encrypted data of the second encrypted content #2 encrypted by the encryption key K21 and encrypted data encrypted by the encryption key k22 in the range Ra1 to Ra2
. . . .

As a result, data received by the client A will be data shown in FIG. 16B.

Figure 17:
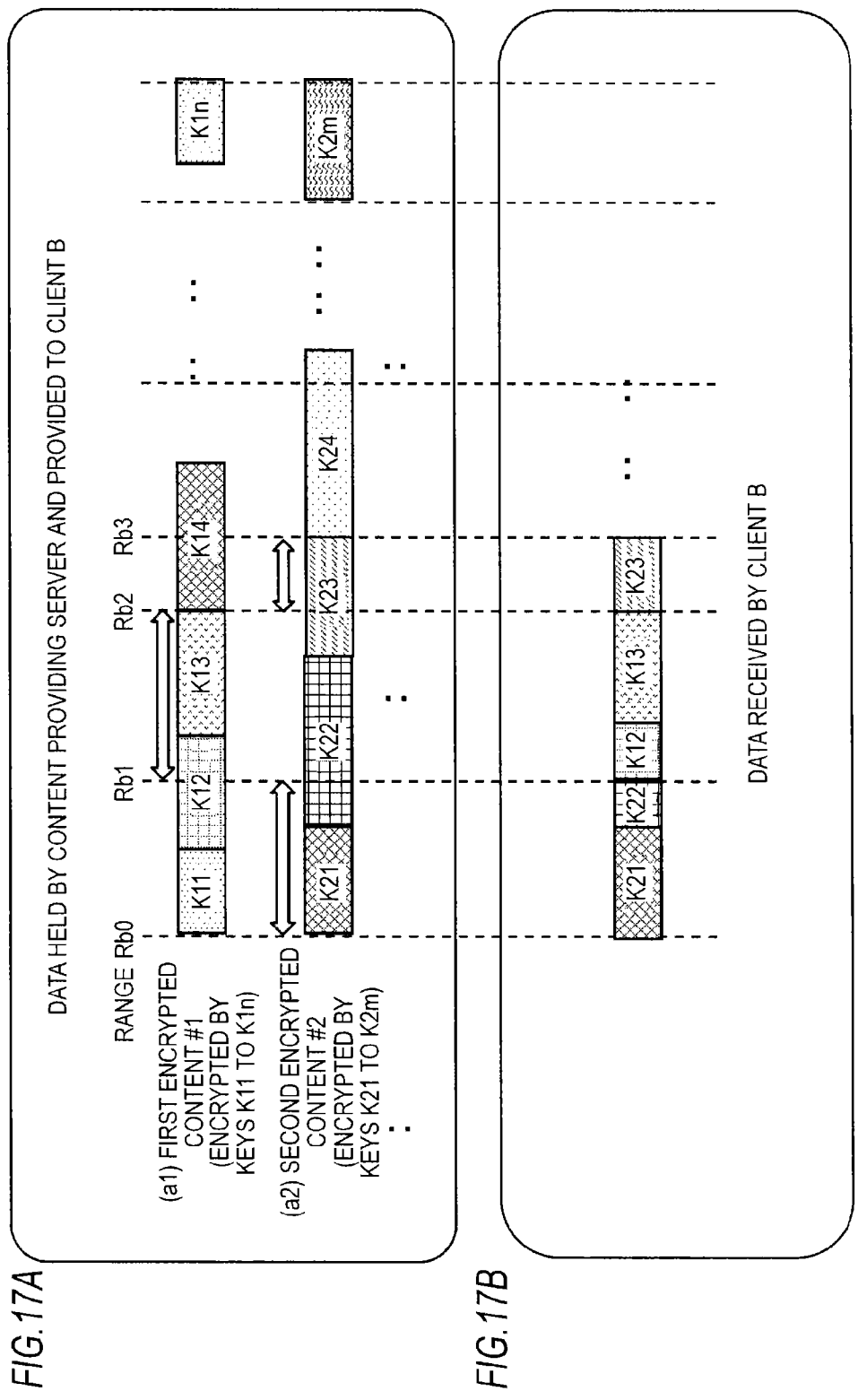
FIGS. 17A and 17B are diagrams for explaining an example of data provided to a client by the content providing server.

FIGS. 17A and 17B show a processing example with respect to the client B which is different from FIGS. 16A and 16B.

That is, FIG. 17A shows data held by the content providing server and provided to the client B and FIG. 17B shows data received by the client B.

Encrypted contents (a1) #1 to (an) #n are the same as the encrypted contents shown in FIG. 16A, having a configuration in which one encrypted content (#x) is encrypted by plural encryption keys in respective partial data.

For example, arrow-ranges in FIG. 17A indicate data selected in accordance with range information transmitted from the client B to the content transmission server. That is, partial data in ranges prescribed by the arrow-ranges in the encrypted contents (a1) #1 to (an) #n is selected and provided to the client B.

In the example shown in FIG. 17A, range data as prescribed partial data is extracted from respective encrypted contents #1 to #n and provided to the client B as described below:

(a1) encrypted data of the first encrypted content #1 encrypted by the encryption key K11 and encrypted data encrypted by the encryption key K12 in the range Ra0 to Ra1 which is partial data of the content, (a2) encrypted data of the second encrypted content #2 encrypted by the encryption key K22 and encrypted data encrypted by the encryption key K23 in the range Ra1 to Ra2
. . . .

As a result, data received by the client B will be data shown in FIG. 17B.

In the embodiment, plural keys may be necessary for decrypting the content by the client even in one range data. Therefore, range information including key-switching position information is provided form the management server to the client, and the client executes switching of keys with reference to the range information to thereby decrypt and reproduce the content when performing reproduction processing.

FIG. 18 is a chart for explaining data to be recorded by the management server as management information of delivery contents in the processing example.

FIG. 18 shows a data configuration example of management information held in the storage unit of the management server.

As shown in FIG. 18, the management information includes, for example, the following information:
 delivery content information,
 delivery destination information,
 delivery user information,
 delivery date information,
 range information and
 delivery encryption key information.

The setting is the same as the management information shown in FIG. 11 explained in the above embodiment.

The delivery content information includes information such as content titles and content IDs.

The delivery destination information is information of addresses of content delivery destinations, for example, addresses corresponding to clients or users.

The delivery user information is user information such as user names, addresses and contact addresses.

The delivery date information is information of delivery dates of contents.

Range information is data in which encrypted contents (#1 to #n) provided to respective clients and ranges are recorded.

In the example of FIG. 18, transmission of the following data is registered with respect to a client of Entry (1):
 Encrypted content (#1): Ranges Ra1 to Ra2, and Rax to Ray,
 Encrypted content (#2): Range Ra2 to Ra3
. . . .

Transmission of the following data is registered with respect to a client of Entry (2):
 Encrypted content (#1): Ranges Rb1 to Rb2,
 Encrypted content (#3): Ranges Rb2 to Rb3, Rbx to Rby
. . . .

In this example, the delivery decryption key information is different from the above management information explained with reference to FIG. 11, and much more key information is registered.

For example, when an illegally-distributed content is found out, the management server analyzes range data included in the illegally-distributed content and checks the data with the management information to thereby extract an entry having a corresponding range data pattern. It is possible to specify a client registered in the extracted entry as a source of the illegally-distributed content.

It is also possible to check the combination of illegally-distributed keys with delivery encryption key information registered in the management information to thereby specify a source of illegally-distributed keys.

[9. Hardware Configuration of Respective Devices]

Figure 19:
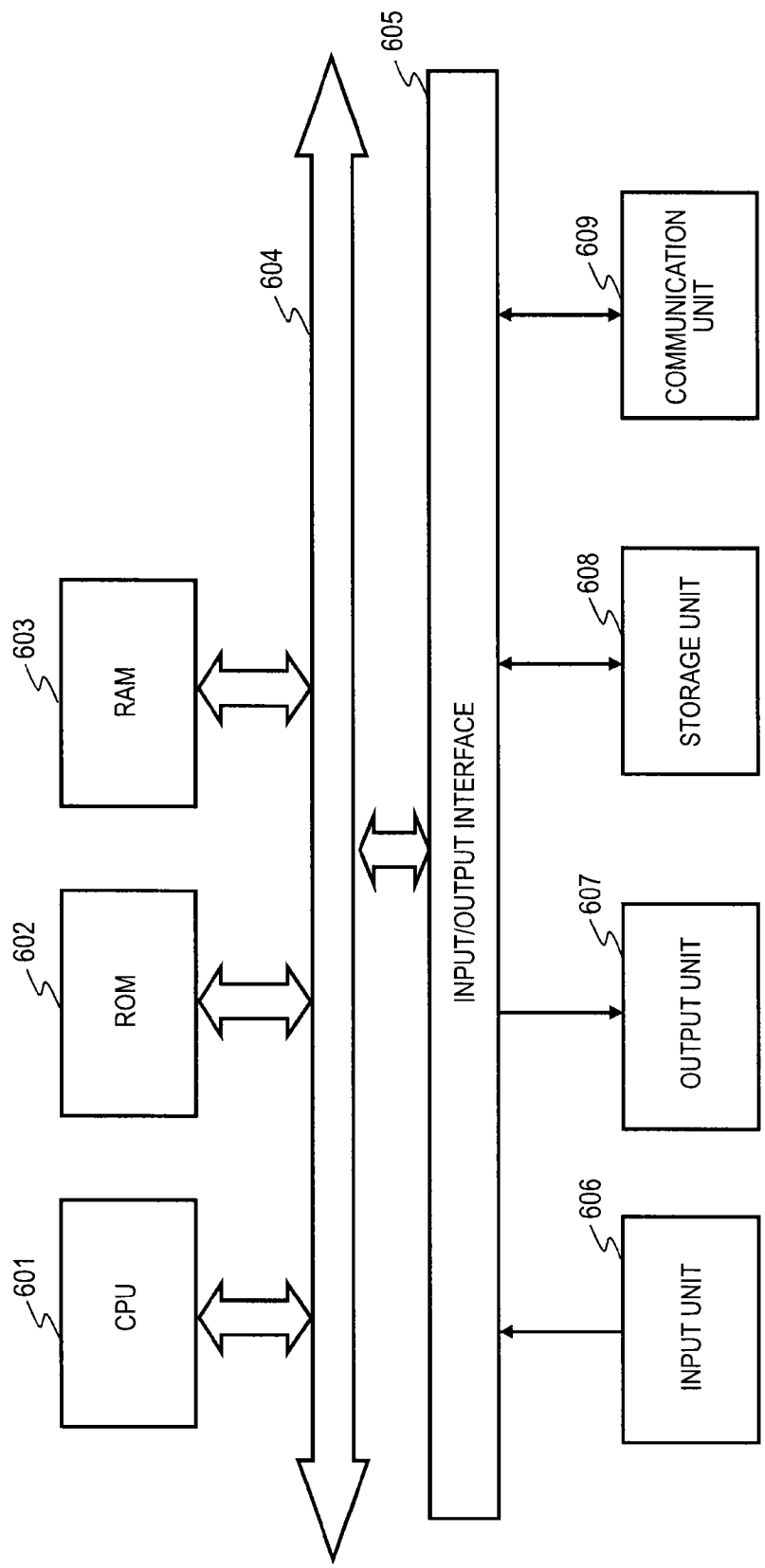
FIG. 19 is a diagram for explaining a hardware configuration of a server.
Figure 20:
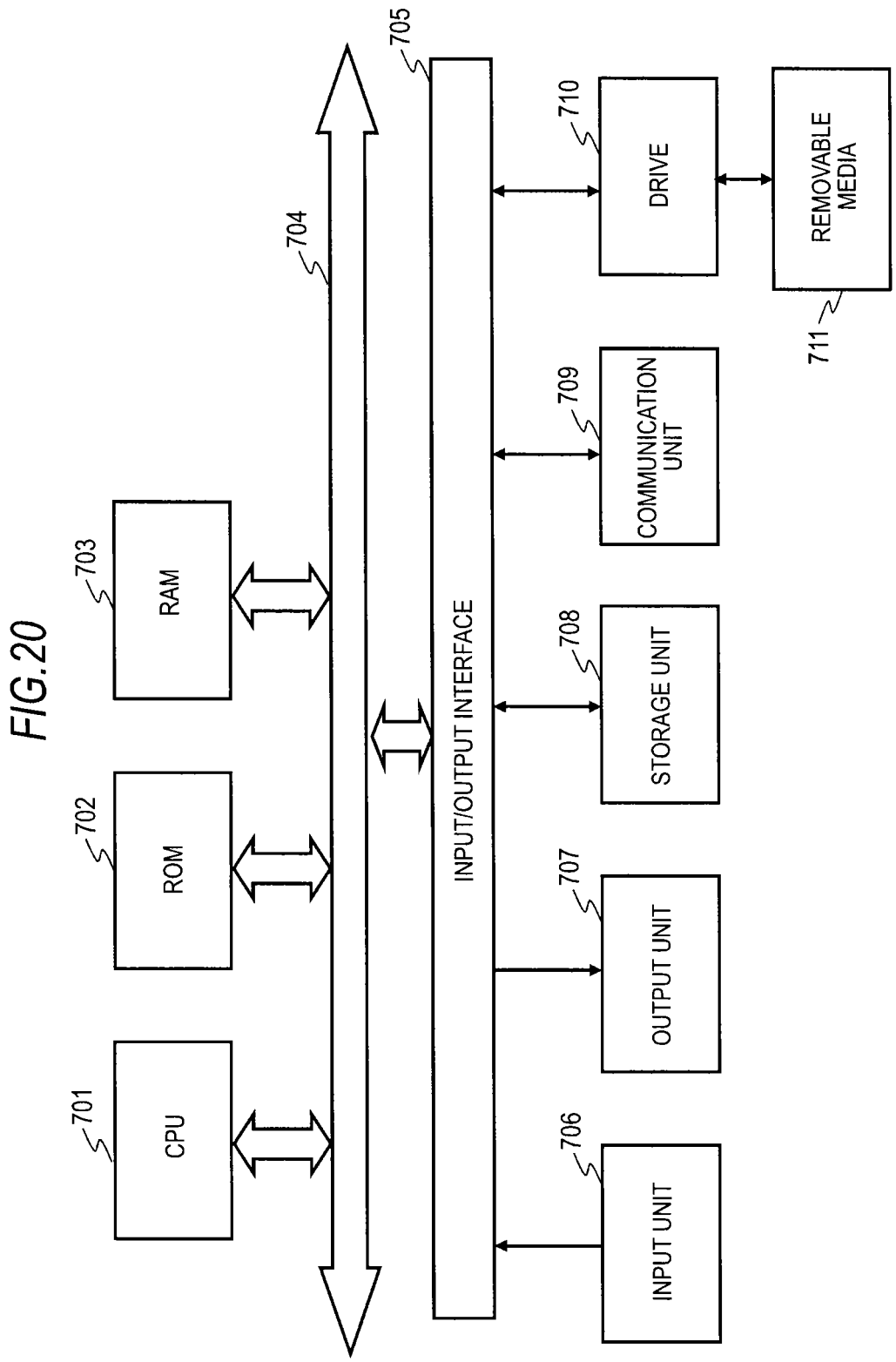
FIG. 20 is a diagram for explaining a hardware configuration of a client.

Lastly, examples of hardware configuration of respective devices executing the above processing will be explained with reference to FIG. 19 and FIG. 20.

First, an example of hardware configuration of a server executing processing of management information and content providing processing will be explained with reference to FIG. 19.

A CPU (Central Processing Unit) 601 functions as a data processing unit executing various processing in accordance with programs stored in a ROM (Read Only Memory) 602 or a storage unit 608.

For example, the CPU 601 executes the generation processing of encrypted contents, the content providing processing, creation/recording processing of management information and so on explained in the above respective embodiments. In a RAM (Random Access Memory) 603, programs and data executed by the CPU 601 are appropriately stored. The CPU 601, the ROM 602 and the RAM 603 are mutually connected through a bus 604.

The CPU 601 is connected to an input/output interface 605 through the bus 604, and an input unit 606 including various switches, a keyboard, a mouse, a microphone and so on and an output unit 607 including a display, a speaker and so on are connected to the input/output interface 605. The CPU 601 executes various processing in response to instructions inputted from the input unit 606 and outputs processing results to, for example, the output unit 607.

The storage unit 608 connected to the input/output interface 605 includes, for example, a hard disk and so on, storing programs and various data executed by the CPU 601. For example, encrypted contents, management information and so on are recorded.

A communication unit 609 performs communication with external devices through networks such as Internet and a local area network.

Next, an example of hardware configuration of a client device executing receiving and reproducing processing of contents will be explained with reference to FIG. 20.

A CPU (Central Processing Unit) 701 functions as a data processing unit executing various processing in accordance with programs stored in a RAM (Read Only Memory) 702 or a storage unit 708.

For example, the CPU 701 executes communication processing with respect to the server, recording processing of received data from the server to a storage unit 708 (hard disk and so on), reproduction processing of data from the storage unit 708 (hard disk and so on).

In a RAM (Random Access Memory) 703 suitably stores programs and data executed by a CPU 701 are appropriately stored. The CPU 701, the ROM 702 and the RAM 703 are mutually connected through a bus 704.

The CPU 701 is connected to the input/output interface 705 through the bus 704, and an input unit 706 including various switches, a keyboard, a mouse, a microphone and so on and an output unit 707 including a display, a speaker and so on are connected to the input/output interface 705. The CPU 701 executes various processing in response to instructions inputted from the input unit 706 and outputs processing results to, for example, the output unit 707.

The storage unit 708 connected to the input/output interface 705 includes, for example, a hard disk and so on, storing programs and various data executed by the CPU 701. A communication unit 709 performs communication with external devices through networks such as Internet and a local area network.

A drive 710 connected to the input/output interface 705 drives removable media 711 such as a magnetic disc, an optical disc, a magneto-optical disc or a semiconductor memory, acquiring recorded various data such as contents and programs.

[10. Brief of Configuration of Present Disclosure]

As described above, the configuration of the present disclosure has been described in detail with reference to specific examples. However, it will be apparent to those skilled in the art that modifications or alternations of the embodiment may be made within a scope not departing from the gist of the present disclosure. That is, the present disclosure has been disclosed as an exemplification and it should not be interpreted in a limited manner. In order to determine the gist of the present disclosure, the appended claims should be taken into account.

The technology according to the present disclosure may be implemented as the following configurations.

(1) An information processing system including a client executing acquisition and reproduction of a content, a management server providing the client with content selection information applied for acquisition of the content, and a content providing server receiving the content selection information from the client and providing the content selected in accordance with the content selection information, in which the content selection information includes content identifiers as identifiers of encrypted contents respectively encrypted by different encryption keys and range information indicating data areas of range data which is configuration data of respective encrypted contents, and the content providing server provides the client with an encrypted content formed by combining range data as partial data of the encrypted contents specified by the content identifiers and the range information.

(2) The information processing system described in the above (1), in which the content providing server holds encrypted contents #1 to #n respectively encrypted by different encryption keys, selects encrypted contents corresponding to the content identifiers received from the client and further extracts range data specified by the range information from the selected encrypted contents to be provided to the client.

(3) The information processing system described in the above (1) or (2), in which the content providing server holds encrypted contents #1 to #n each encrypted by one encryption key which is different according to each encrypted content, selects encrypted contents corresponding to the content identifiers received from the client and further extracts range data specified by the range information from the selected encrypted contents to be provided to the client.

(4) The information processing system described in the above (1) or (2), in which the content providing server holds encrypted contents #1 to #n respectively encrypted by different plural encryption keys, selects encrypted contents corresponding to the content identifiers received from the client and further extracts range data specified by the range information from the selected encrypted contents to be provided to the client.

(5) The information processing system described in any one of the above (1) to (4), in which the management server generates different content selection information having different content identifiers and range information in each processing of providing the content selection information with respect to the client and provides the information to the client.

(6) The information processing system described in any one of the above (1) to (5), in which the management server executes processing of generating management information in which the content selection information provided to the client is associated with client information of the client to which the content selection information has been provided and storing the information in a storage unit.

(7) The information processing system described in any one of the above (1) to (6), in which the client performs decryption processing by switching the encryption key in each range data with reference to the range information at the time of reproduction processing of the received content from the content providing server.

Additionally, respective devices included in the above system, methods of processing executed in respective devices and programs for executing processing are included in configuration of the present disclosure.

A series of processing explained in the specification can be executed by hardware/software, or a composite configuration of hardware and software. When processing is performed by software, it is possible to install a program to be executed, which records a processing sequence in a memory in a computer incorporated in dedicated hardware, or to install the program to be executed in a general-purpose computer which can execute various processing. For example, the program can be recorded in a recording medium in advance. In addition to install the program into a computer from a recording medium, the program can be received through networks such as a LAN (Local Area Network) or Internet and installed in a recording medium such as an internal hard disk.

Furthermore, various processing described in the specification can be not only executed in time series in accordance with the description but also executed in parallel or individually according to processing power of devices executing the processing or according to need. A system is defined in the specification as logical aggregate of plural devices and is not limited to a system in which devices of respective configurations are in the same casing.

As described above, according to the embodiment of the present disclosure, the configuration capable of preventing unauthorized use of contents can be realized.

Specifically, the content providing server executing processing of providing contents to a client provides the client with an encrypted content formed by combining range data as partial data of the encrypted contents specified by the content identifiers and the range information. The content selection information including content identifiers and range information is set as different data according to each client, and correspondence data between content selection information and clients is registered in the database as management information. When an illegally-distributed content is found out, it is possible to specify the source client, which can prevent unauthorized use of contents.

The present disclosure contains subject matter related to that disclosed in Japanese Priority Patent Application JP 2011-121344 filed in the Japan Patent Office on May 31, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing system comprising:
a content providing server that stores a plurality of copies of a content, each copy of the content stored while encrypted with a different encryption key; and
a management server that transmits content selection information to a client device, the content selection information including range information and a set of encryption keys, wherein
each copy of the content is divided into a plurality of content fragments, the range information includes information relating to beginning and end positions of each of the content fragments, each copy of the content having the same range information and the same beginning and end positions of each of the content fragments,
the set of encryption keys includes a same number of encryption keys as a number of copies of the content stored by the content providing server,
each encryption key of the set of encryption keys corresponding to a different copy of the content and used for the encryption and decryption of the corresponding copy of the content,
the content providing server is configured to
receive a content acquisition request from the client device, the content acquisition request including the range information and a copy identifier for a specific content fragment from a particular copy of the content,
determine the specific content fragment from the particular copy of the content that corresponds to the range information and the copy identifier included in the content acquisition request, and
transmit the specific fragment of content to the client device, and
the copy identifier corresponds to a particular encryption key of the set of encryption keys provided in the content selection information for the range information in the transmitted content acquisition request.

2. The information processing system according to claim 1, wherein the content providing server is configured to store each copy of the content with different plural encryption keys.

3. The information processing system according to claim 1, wherein the management server is configured to generate different content selection information having different range information and sets of encryption keys in each processing of providing the content selection information with respect to the client and provides the information to the client.

4. The information processing system according to claim 1, wherein the management server is configured to
generate management information for managing the distribution of content to particular client devices, the management information including the content selection information provided to the client device and information that identifies the client device associated with the content selection information and
store the management information.

5. The information processing system according to claim 4, wherein the management information associates the client device and the set of encryption keys.

6. The information processing system according to claim 5, wherein the management server is further configured to
analyze an identified copy of the content to determine a set of encryption keys corresponding to the identified copy of content; and
identify a client device that is associated with the set of encryption keys corresponding to the identified copy of content based on the stored management information.

7. The information processing system according to claim 6, wherein the identified copy of the content is a decrypted copy of the content that has been published.

8. The information processing system according to claim 5, wherein the management server is further configured to
analyze an identified set of encryption keys; and
identify a client device that is associated with the identified set of encryption keys based on the stored management information.

9. The information processing system according to claim 4, wherein the management server is further configured to
transmit content selection information to a plurality of client devices, the content selection information provided to each client device being different,
generate a management information table that includes the content selection information provided to each client device and associates each of the client devices with a respective set of encryption keys from the respective content selection information.

10. The information processing system according to claim 9, wherein the management server is further configured to
analyze an identified copy of the content to determine a set of encryption keys corresponding to the identified copy of content; and
identify a particular client device that is associated with the set of encryption keys corresponding to the identified copy of content based on the stored management information table.

11. The information processing system according to claim 1, further comprising the client device, wherein
the client device is configured to decrypt the received fragment content according to the particular encryption key corresponding to the range information of the received fragment content.

12. The information processing system according to claim 1, wherein the management server is further configured to receive a content acquisition inquiry from the client device.

13. A content providing device comprising:
a storage device that stores a plurality of copies of a content, each copy of the content stored while encrypted with a different encryption key; and
circuitry configured to
receive a content acquisition request from a client device that holds a set of encryption keys, wherein the set of encryption keys includes a same number of encryption keys as the number of copies of the content stored by the storage device, and wherein each encryption key of the set of encryption keys corresponds to a different copy of the content and is used for the encryption and decryption of the corresponding copy of the content,
wherein the content acquisition request includes range information and a copy identifier, the range information indicating beginning and end positions of data areas of the content and being the same for each copy of the content, and the copy identifier identifying a particular copy of the content and corresponding to a particular encryption key of the set of encryption keys held by the client;
determine a specific content fragment from the particular copy of the content that corresponds to the range information and the copy identifier included in the content acquisition request; and
transmit the specific fragment of the content to the client device.

14. A management device comprising:
circuitry configured to
manage a content providing server that stores a plurality of copies of a content, each copy of the content stored while encrypted with a different encryption key;
receive a content acquisition inquiry from a client device, the content acquisition inquiry relating to the content stored by the content providing server;
generate and transmit content selection information to the client device, the content selection information including range information and a set of encryption keys relating to a content inquired in the content acquisition inquiry, wherein
the circuitry generates different content selection information having different range information and sets of encryption keys in each processing of providing the content selection information with respect to the client device,
each copy of the content is divided into a plurality of content fragments,
the range information includes information relating to beginning and end positions of each of the content fragments, each copy of the content having the same range information and the same beginning and end positions of each of the content fragments,
the set of encryption keys includes a same number of encryption keys as a number of copies of the content stored by the content providing server, and each encryption key of the set of encryption keys corresponding to a different copy of the content and used for the encryption and decryption of the corresponding copy of the content.

15. The management device according to claim 14, wherein the circuitry is further configured to
generate management information for managing the distribution of content to particular client devices, the management information including the content selection information provided to the client device and information that identifies the client device associated with the content selection information, and store the management information.

16. An information processing device comprising:
circuitry configured to
transmit a content acquisition inquiry to a management server, the content acquisition inquiry relating to the content stored by a content providing server, wherein the content providing server stores a plurality of copies of the content each copy of the content stored while encrypted with a different encryption key and each copy of the content is divided into a plurality of content fragments;
receive content selection information from the management server, the content selection information relating to the content inquired by the content acquisition inquiry and the content selection information including range information and a set of encryption keys, wherein the range information includes information relating to beginning and end positions of each of the content fragments, each copy of the content having the same range information and the same beginning and end positions of each of the content fragments, and the set of encryption keys includes a same number of encryption keys as a number of copies of the content stored by the content providing server;
transmit a content acquisition request to the content providing server, the content acquisition request including the range information and a copy identifier for a specific content fragment from a particular copy of the content;
receive the specific fragment of content to the client device; and
store the specific fragment of content.

17. The information processing device according to claim 16, wherein the circuitry is further configured to decrypt the received fragment content according to the particular encryption key corresponding to the range information of the received fragment content.

18. A content providing method executed in a content providing device including a storage device, the method comprising:
storing a plurality of copies of a content, each copy of the content stored while encrypted with a different encryption key;
receiving a content acquisition request from a client device that holds a set of encryption keys, wherein the set of encryption keys includes a same number of encryption keys as the number of copies of the content stored by the storage device, and wherein each encryption key of the set of encryption keys corresponds to a different copy of the content and is used for the encryption and decryption of the corresponding copy of the content,
wherein the content acquisition request includes range information and a copy identifier, the range information indicating beginning and end positions of data areas of the content and being the same for each copy of the content, and the copy identifier identifying a particular copy of the content and corresponding to a particular encryption key of the set of encryption keys held by the client;
determining a specific content fragment from the particular copy of the content that corresponds to the range information and the copy identifier included in the content acquisition request; and
transmitting the specific fragment of the content to the client device.

19. A management method executed in a management device including circuitry, the management method comprising:
- managing a content providing server that stores a plurality of copies of a content, each copy of the content stored while encrypted with a different encryption key;
- receiving a content acquisition inquiry from a client device, the content acquisition inquiry relating to the content stored by the content providing server;
- generating and providing content selection information to the client device,
- the content selection information including range information and a set of encryption keys relating to a content inquired in the content acquisition inquiry, wherein
- the data processing generates different content selection information having different range information and sets of encryption keys in each processing of providing the content selection information with respect to the client device,
- each copy of the content is divided into a plurality of content fragments,
- the range information includes information relating to beginning and end positions of each of the content fragments, each copy of the content having the same range information and the same beginning and end positions of each of the content fragments,
- the set of encryption keys includes a same number of encryption keys as a number of copies of the content stored by the content providing server, and
- each encryption key of the set of encryption keys corresponding to a different copy of the content and used for the encryption and decryption of the corresponding copy of the content.

20. An information processing method executed in an information processing device, comprising:
- transmitting a content acquisition inquiry to a management server, the content acquisition inquiry relating to the content stored by a content providing server, wherein the content providing server stores a plurality of copies of the content each copy of the content stored while encrypted with a different encryption key and each copy of the content is divided into a plurality of content fragments;
- receiving content selection information from the management server, the content selection information relating to the content inquired by the content acquisition inquiry and the content selection information including range information and a set of encryption keys, wherein the range information includes information relating to beginning and end positions of each of the content fragments, each copy of the content having the same range information and the same beginning and end positions of each of the content fragments, and the set of encryption keys includes a same number of encryption keys as a number of copies of the content stored by the content providing server;
- transmitting a content acquisition request to the content providing server, the content acquisition request including the range information and a copy identifier for a specific content fragment from a particular copy of the content;
- receiving the specific fragment of content to the client device; and
- storing the specific fragment of content.

21. A non-transitory computer readable medium storing computer readable instructions that, when executed by a computer including circuitry, causes the computer to execute a process, the process comprising:
- storing a plurality of copies of a content, each copy of the content stored while encrypted with a different encryption key;
- receiving a content acquisition request from a client device that holds a set of encryption keys, wherein the set of encryption keys includes a same number of encryption keys as the number of copies of the content stored by the storage device, and wherein each encryption key of the set of encryption keys corresponds to a different copy of the content and is used for the encryption and decryption of the corresponding copy of the content,
- wherein the content acquisition request includes range information and a copy identifier, the range information indicating beginning and end positions of data areas of the content and being the same for each copy of the content, and the copy identifier identifying a particular copy of the content and corresponding to a particular encryption key of the set of encryption keys held by the client;
- determining a specific content fragment from the particular copy of the content that corresponds to the range information and the copy identifier included in the content acquisition request; and
- transmitting the specific fragment of the content to the client device.

22. A non-transitory computer readable medium storing computer readable instructions that, when executed by a computer including circuitry, causes the computer to execute a process, the process comprising:
- managing a content providing server that stores a plurality of copies of a content, each copy of the content stored while encrypted with a different encryption key;
- receiving a content acquisition inquiry from a client device, the content acquisition inquiry relating to the content stored by the content providing server;
- generating and providing content selection information to the client device, the content selection information including range information and a set of encryption keys relating to a content inquired in the content acquisition inquiry, wherein
- the data processing generates different content selection information having different range information and sets of encryption keys in each processing of providing the content selection information with respect to the client device,
- each copy of the content is divided into a plurality of content fragments,
- the range information includes information relating to beginning and end positions of each of the content fragments, each copy of the content having the same range information and the same beginning and end positions of each of the content fragments,
- the set of encryption keys includes a same number of encryption keys as a number of copies of the content stored by the content providing server, and
- each encryption key of the set of encryption keys corresponding to a different copy of the content and used for the encryption and decryption of the corresponding copy of the content.

23. A non-transitory computer readable medium storing computer readable instructions that, when executed by a computer including circuitry, causes the computer to execute a process, the process comprising:
- transmitting a content acquisition inquiry to a management server, the content acquisition inquiry relating to the content stored by a content providing server, wherein the content providing server stores a plurality of copies of the content each copy of the content stored while encrypted with a different encryption key and each copy of the content is divided into a plurality of content fragments;

receiving content selection information from the management server, the content selection information relating to the content inquired by the content acquisition inquiry and the content selection information including range information and a set of encryption keys, wherein the range information includes information relating to beginning and end positions of each of the content fragments, each copy of the content having the same range information and the same beginning and end positions of each of the content fragments, and the set of encryption keys includes a same number of encryption keys as a number of copies of the content stored by the content providing server;

transmitting a content acquisition request to the content providing server, the content acquisition request including the range information and a copy identifier for a specific content fragment from a particular copy of the content;

receiving the specific fragment of content to the client device; and storing the specific fragment of content.

* * * * *